United States Patent
Miyadera et al.

(10) Patent No.: US 7,496,254 B2
(45) Date of Patent: Feb. 24, 2009

(54) CURVED OPTICAL WAVEGUIDE AND OPTICAL DEVICE

(75) Inventors: Nobuo Miyadera, Ibaraki (JP); Rei Yamamoto, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 190 days.

(21) Appl. No.: 10/587,170

(22) PCT Filed: Jan. 20, 2005

(86) PCT No.: PCT/JP2005/000703

§ 371 (c)(1),
(2), (4) Date: Jul. 25, 2006

(87) PCT Pub. No.: WO2005/071454

PCT Pub. Date: Aug. 4, 2005

(65) Prior Publication Data

US 2007/0154141 A1   Jul. 5, 2007

(30) Foreign Application Priority Data

Jan. 26, 2004 (JP) ............... 2004-016536
Jan. 26, 2004 (JP) ............... 2004-016537

(51) Int. Cl.
*G02B 6/26* (2006.01)
*G02B 6/28* (2006.01)

(52) U.S. Cl. ............... 385/32; 385/24; 385/45; 385/48

(58) Field of Classification Search ............... 385/32
See application file for complete search history.

(56) References Cited

U.S. PATENT DOCUMENTS

| 5,222,167 | A | 6/1993 | Jean et al. |
| 2003/0228107 | A1* | 12/2003 | Howerton et al. ............. 385/47 |
| 2005/0089295 | A1* | 4/2005 | Guo et al. ................... 385/140 |
| 2007/0036501 | A1* | 2/2007 | Miyadera et al. ............ 385/129 |

FOREIGN PATENT DOCUMENTS

| JP | 05-196826 | 8/1993 |
| JP | 05-203453 | 8/1993 |
| JP | 07-159635 | 6/1995 |
| JP | 11-295538 | 10/1999 |
| JP | 2004-302143 | 10/2004 |

OTHER PUBLICATIONS

Nobuo Miyadera et al., "Hikari Splitter-yo Polymer Hikaridoharo Kiban no Kaihatsu" Hitachi Kasei Technical Report, 2004, 07 No. 43, pp. 29-34.

* cited by examiner

*Primary Examiner*—Michelle R Connelly Cushwa
(74) *Attorney, Agent, or Firm*—Antonelli, Terry, Stout & Kraus, LLP.

(57) ABSTRACT

A curved optical waveguide comprising a core and a clad, characterized in that: the core shape of the curved optical waveguide has no reversal of a curvature on a halfway; and curvatures at both ends of the curved optical waveguide gradually approach zero. A curved optical waveguide comprising a core and a clad, characterized in that: the core shape of the curved optical waveguide has no reversal of a curvature on a halfway; a curvature at one end of the curved optical waveguide gradually approaches zero; and a radius of curvature at other end is finite. An optical waveguide comprising such a curved optical waveguide and an optical waveguide having a different core shape optically connected with the former, and an optical device using such a curved optical waveguide.

23 Claims, 11 Drawing Sheets

LEFT END (INLET) FORMS ANGLE OF θ RELATIVE TO Z-AXIS.

RIGHT END (OUTLET) FORMS ANGLE OF -θ RELATIVE TO Z-AXIS.

LEFT END (INLET) IS PARALLEL WITH Z-AXIS.

RIGHT END (OUTLET) FORMS ANGLE OF θ RELATIVE TO Z-AXIS.

LEFT END (INLET) FORMS ANGLE OF θ1 RELATIVE TO Z-AXIS.

RIGHT END (OUTLET) FORMS ANGLE OF θ2 RELATIVE TO Z-AXIS.

CONNECTION WITH MULTI-MODE OPTICAL WAVEGUIDE

CONNECTION WITH OPTICAL FIBER

CURVED OPTICAL WAVEGUIDE AND OPTICAL DEVICE

TECHNICAL FIELD

The present invention relates to a curved optical waveguide and an optical device using the same.

BACKGROUND ART

There has been an abruptly growing demand on information transmission in association with a recent widespread use of personal computers and the Internet, so optical transmission with a high transmission rate has become widespread. An optical waveguide has been used as an optical interconnection in such optical transmission.

When a 1×2 branching section is constituted, for example, in the case where a branching and coupling device for optical transmission is constituted, in junctions where two curved optical waveguides connect with a branching section (outlets of a branching section of the optical waveguide), gradually widening a gap between both the curved optical waveguides from an infinitesimal one is an ideal way effective in reducing an excessive loss at a branching section. However, it is extremely difficult to form an infinitesimal gap in high yield and to widen the gap from an infinitesimal one gradually owing to restrictions upon production. Accordingly, at the junctions of the curved optical waveguides with the outlets of the branching section of the optical waveguide, the occurrence of axial deviation can suppress the excessive loss at the branching section. That is, each mode center causes axial deviation toward an inner side, so both the curved optical waveguides can be connected with the branching section with a low loss even when the gap between both the curved optical waveguides is widened. As described above, widening the gap between both the curved optical waveguides can not only reduce an influence of a variation upon production in shape of the branching section but also alleviate embedding failure at a narrow width part that may occur by a clad material. To this end, a circular-arc type curved optical waveguide can be effectively used.

A radius of curvature at each of both ends of a curved optical waveguide using a circular arc is finite. Accordingly, a curvature changes discontinuously at the junctions when the curved optical waveguide connects with a straight line-optical waveguide. As a result, the central axis of a propagation mode causes axial deviation with respect to the geometrical central position of a waveguide structure. Accordingly, the waveguide structure at the junction must be provided with axial deviation for improving mode matching at the junction to provide a waveguide causing a low loss. Since an axial deviation amount depends on a relative refractive index between a core and a clad, the dimensions of the core, and a wavelength, the fact that fluctuations in the refractive index and the dimensions of the core due to variations upon production are responsible for a fluctuation in loss has been a problem. The incapability to provide an optimum axial deviation amount in a wide wavelength range due to wavelength dependence has been also a problem.

On the other hand, when a circular-arc type curved optical waveguide is used in an inlet of a branching section of the optical waveguide, a mode center causes axial deviation and a mode shape asymmetric with respect to a central axis is established owing to a finite radius of curvature. Accordingly, it has been difficult to establish a symmetric branching ratio (1:1). In addition, an axial deviation amount and asymmetry are different at different wavelengths, so it has been difficult to keep a branching ratio constant in a wide wavelength range. In view of the foregoing, an approach to connecting a straight line-optical waveguide with an inlet of a branching section of the optical waveguide is adopted. However, the approach involves a disadvantage in that an excessive loss occurs at a junction of the straight line-optical waveguide with a curved optical waveguide and a disadvantage in that the total length of an optical waveguide increases so that the size of the optical waveguide increases.

That is, the connection of a circular-arc type curved optical waveguide with an outlet of a branching section of the optical waveguide is advantageous. On the other hand, an optical waveguide having an infinite radius of curvature (a curvature of zero) such as a straight line-optical waveguide is preferably connected with an inlet of a branching section of the optical waveguide for establishing a symmetric branching ratio (1:1).

When the shape of the optical waveguide (core) is of a curved type such as an S-shape curve, the central axis of an optical propagation mode deviates from the geometrical central axis of the core at a part where a curvature thereof changes discontinuously. As a result, an optical loss occurs. To reduce the loss, part of a curve must be provided with an axial deviation structure part (offset) in which the geometrical central axis of the core is deviated. However, such axial deviation structure depends on a relative refractive index between the core and a clad, the dimensions of the core, and a light wavelength. Accordingly, it is difficult to provide an optimum axial deviation structure owing to factors such as a variation upon production. In general, the absence of an axial deviation structure is preferable because otherwise a problem arises in that an optical loss occurs. The incapability to provide an optimum axial deviation amount in a wide wavelength range due to wavelength dependence has been also a problem.

Here, several functions of creating a curved shape in an optical waveguide or the like in CAD software or the like have been known. One shape is a shape in which two arcs each having a radius of curvature of R are connected in an opposite direction (hereinafter referred to as the arc coupling shape). Since a curvature changes discontinuously at a junction in the arc coupling shape, the junction where the arcs are connected must be provided with an axial deviation structure as described above.

A shape using the following cosine function (referred to as S-bend cosine on CAD software) has been also known. The shape eliminates the need for providing the above-described axial deviation structure on a halfway.

$$y=1/2(1-\cos \pi z) \quad \text{[VIII]}$$

However, a curvature at each of both ends of the shape is finite, so the joining of the shape with a straight line-optical waveguide involves the need for providing an axial deviation structure (FIG. 2).

In addition, a shape using the following sine function (referred to as S-bend sine on CAD software) eliminates the need for providing a curve with an axial deviation structure on a halfway. In addition, a radius of curvature at each of both ends of the shape is infinite (a curvature is zero). Accordingly, when the curved optical waveguide is joined with straight line-optical waveguides at its both ends, the central axes of the curved optical waveguide and of the straight line-optical waveguides coincide with each other, so there is no need for providing an axial deviation structure.

$$y=z-(1/2\pi)\sin 2\pi z \quad \text{[IX]}$$

Some documents (see, for example, Non-patent Document 1 below) each have general description concerning such axial deviation structure of an optical waveguide.

There has been also proposed a branching/multiplexing optical waveguide in which a junction between the inflection point of a branching section of the optical waveguide and an output waveguide is provided with axial deviation, and a gap is provided between the branching waveguides at the branching point of a taper waveguide so that the deviation of peaks of a field distribution in a curved optical waveguide can be covered (see Patent Document 1 below).

There have been also proposed an optical coupler using an optical waveguide having many arcs to facilitate modularization and a method of manufacturing thereof (see Patent Document 2 below).

Non-patent Document 1: Light Wave Engineering, Yasuo Kokubu, KYORITSU SHUPPAN CO., LTD, p 250

Patent Document 1: JP 2809517 B

Patent Document 2: JP 2002-530690 A

DISCLOSURE OF THE INVENTION

An object of the present invention is to provide a curved optical waveguide that can be suitably used in the case where such optical waveguides having different properties as described above are connected under such circumstances.

The present invention provides a curved optical waveguide comprising a core and a clad, the curved optical waveguide being characterized in that the core shape of the curved optical waveguide has no reversal of a curvature on a halfway, and curvatures at both ends of the curved optical waveguide gradually approach zero; and a curved optical waveguide in which the core shape of the curved optical waveguide has no reversal of a curvature on a halfway, a curvature at one end of the curved optical waveguide gradually approaches zero, and a radius of curvature at the other end of the curved optical waveguide is finite.

In addition, the present invention provides an optical waveguide comprising such curved optical waveguide and an optical waveguide having a different core shape optically connected with the former, and an optical device using such curved optical waveguide.

That is, the present invention provides the following.

(1) A curved optical waveguide comprising: a core; and a clad, characterized in that: a core shape of the curved optical waveguide has no reversal of a curvature on a halfway; and curvatures at both ends of the curved optical waveguide gradually approach zero.

(2) A curved optical waveguide comprising: a core; and a clad, in which: a core shape of the curved optical waveguide has no reversal of a curvature on a halfway; a curvature at one end of the curved optical waveguide gradually approaches zero; and a radius of curvature at the other end of the curved optical waveguide is finite.

(3) A curved optical waveguide according to the above item (1), in which the core shape is defined by the following equation [I]:

$$y=\sin \pi z \qquad [\mathrm{I}]$$

wherein y and z represent coordinate axes perpendicular to each other on a plane where the optical waveguide is present.

(4) A curved optical waveguide according to the above item (1), in which the core shape is defined by the following equation [II]:

$$y=z-[(1/\pi)\sin \pi z] \qquad [\mathrm{II}]$$

wherein y and z represent coordinate axes perpendicular to each other on a plane where the optical waveguide is present.

(5) A curved optical waveguide according to the above item (1), in which the core shape is defined by the following equation [III]:

$$y=z-[(a/\pi)\sin \pi z] \qquad [\mathrm{III}]$$

wherein y and z represent coordinate axes perpendicular to each other on a plane where the optical waveguide is present, and a represents a real number except zero.

(6) An optical waveguide comprising: the curved optical waveguide according to the above item (1); and an optical waveguide having a different core shape optically connecting with each other.

(7) An optical waveguide comprising: the curved optical waveguide according to the above item (1); and an optical waveguide having a different core shape optically connecting with each other in a manner that their geometrical central axes are aligned with each other.

(8) An optical waveguide according to the above item (6) or (7), in which the optical waveguide having the different core shape is a non-S-shape curved optical waveguide comprising a core and a clad in which a core shape of the non-S-shape curved optical waveguide has no reversal of a curvature on a halfway, a curvature at one end of the non-S-shape curved optical waveguide gradually approaches zero, and a radius of curvature at the other end of the non-S-shape curved optical waveguide is finite.

(9) An optical waveguide according to the above item (8), in which the core shape is defined by the following equation [IV]:

$$y=1-\cos [(\pi/2)z] \qquad [\mathrm{IV}]$$

wherein y and z represent coordinate axes perpendicular to each other on a plane where the optical waveguide is present.

(10) An optical waveguide according to the above item (8), in which the core shape is defined by the following equation [V]

$$y=(1-t)f(z)+t\{1-\cos [(\pi/2)z]\} \qquad [\mathrm{V}]$$

wherein y and z represent coordinate axes perpendicular to each other on a plane where the optical waveguide is present, f(z) represents a continuous function of z which satisfies relationships of f(0)=0, f(1)=1, f"(0)=0, and f"(1)=0 where f"(z) represents a second differential function of f(z) with respect to z, and t represents a real number except zero.

(11) An optical waveguide according to the above item (8), in which the core shape is defined by the following equation [VI]:

$$y=(1-t)z+t\{1-\cos [(\pi/2)z]\} \qquad [\mathrm{VI}]$$

wherein y and z represent coordinate axes perpendicular to each other on a plane where the optical waveguide is present, and t represents a real number except zero.

(12) An optical waveguide according to the above item (8), in which the core shape is defined by the following equation [VII]:

$$y=(1-t) [z-(a/\pi)\sin \pi z]+t\{1-\cos [(\pi/2)z]\} \qquad [\mathrm{VII}]$$

wherein y and z represent coordinate axes perpendicular to each other on a plane where the optical waveguide is present, and t and a each represent a real number except zero.

(13) An optical waveguide according to the above item (6) or (7), in which the optical waveguide having the different core shape is a branching section of the optical waveguide.

(14) An optical waveguide according to the above item (13), in which an inlet of the branching section of the optical waveguide is optically connected with one end of the branching section of the optical waveguide.

(15) An optical waveguide comprising: the curved optical waveguide according to the above item (1); and an optical fiber optically connected with an end of the curved optical waveguide.

(16) An optical waveguide comprising: the curved optical waveguide according to the above item (1); and a guide groove structure for fixing an optical fiber to an end of the curved optical waveguide disposing adjacent with each other.

(17) An optical waveguide according to the above item (8), in which another branching section of the optical waveguide is optically connected with the other end of the curved optical waveguide.

(18) A curved optical waveguide according to the above item (2), in which the core shape is defined by the following equation [IV]:

$$y=1-\cos[(\pi/2)z] \quad [IV]$$

wherein y and z represent coordinate axes perpendicular to each other on a plane where the optical waveguide is present.

(19) A curved optical waveguide according to the above item (2), in which the core shape is defined by the following equation [V]:

$$y=(1-t)f(z)+t\{1-\cos[(\pi/2)z]\} \quad [V]$$

wherein y and z represent coordinate axes perpendicular to each other on a plane where the optical waveguide is present, f(z) represents a continuous function of z which satisfies relationships of f(0)=0, f(1)=1, f"(0)=0, and f"(1)=0 where f"(z) represents a second differential function of f(z) with respect to z, and t represents a real number except zero.

(20) A curved optical waveguide according to the above item (2), in which the core shape is defined by the following equation [VI]:

$$y=(1-t)z+t\{1-\cos[(\pi/2)z]\} \quad [VI]$$

wherein y and z represent coordinate axes perpendicular to each other on a plane where the optical waveguide is present, and t represents a real number except zero.

(21) A curved optical waveguide according to the above item (2), in which the core shape is defined by the following equation [VII]:

$$y=(1-t)[z-(a/\pi)\sin \pi z]+t[1-\cos[(\pi/2)z]] \quad [VII]$$

wherein y and z represent coordinate axes perpendicular to each other on a plane where the optical waveguide is present, and t and a each represent a real number except zero.

(22) An optical waveguide comprising: the curved optical waveguide according to the above item (2); and an optical waveguide having a different core shape optically connecting with each other.

(23) An optical waveguide according to the above item (22), in which the optical waveguide having the different core shape is a branching section of the optical waveguide.

(24) An optical waveguide according to the above item (23), in which the branching section of the optical waveguide is disposed by optically connecting an outlet of the branching section of the optical waveguide with an end of the curved optical waveguide having a finite radius of curvature.

(25) An optical waveguide according to the above item (23), in which the branching section of the optical waveguide is disposed by optically connecting an inlet of the branching section of the optical waveguide with an end of the curved optical waveguide whose curvature gradually approaches zero.

(26) An optical waveguide comprising: the curved optical waveguide according to the above item (2); and an optical fiber disposed by being optically connected with an end of the curved optical waveguide whose curvature gradually approaches zero.

(27) An optical waveguide comprising: the curved optical waveguide according to the above item (2); and a guide groove structure for fixing an optical fiber to an end of the curved optical waveguide whose curvature gradually approaches zero, the guide groove structure being disposed to be adjacent to the curved optical waveguide.

(28) An optical waveguide comprising: the curved optical waveguide according to the above item (2); and a reflecting surface including a filter disposed to be adjacent to an end of the curved optical waveguide having a finite radius of curvature.

(29) An optical waveguide according to any one of the above items (1) to (28), in which the core and/or the clad of the optical waveguide is partially or entirely composed of a polymer.

(30) An optical waveguide according to the above item (29), in which the polymer comprises a polyimide-based resin containing fluorine.

(31) An optical device comprising the optical waveguide according to any one of the above items (1) to (30).

The use of the curved optical waveguide of the present invention enables to constitute an optical waveguide coupled with straight line-optical waveguides at its both ends without axial deviation and with a low loss. In addition, the curved optical waveguide of the present invention can be suitably used for joining with a coupling end of a branching section (a 1-ch side in the case of a 1×2 branching section) as well as joining with a straight line-optical waveguide. At the joining part, an optical waveguide having a smaller variation upon production and higher yield than those in the case where a conventional curved optical waveguide requiring axial deviation is used can be obtained. Furthermore, a good optical waveguide can be provided in a wide wavelength range.

In addition, the use of a curved optical waveguide having a shape defined by the above function enables to constitute an optical waveguide coupled with a straight line-waveguide at one end of the optical waveguide without axial deviation and with a low loss and coupled with a curved optical waveguide having the same curvature as that of the optical waveguide at the other end of the optical waveguide without axial deviation. In addition, the use of the curved optical waveguide of the present invention enables to constitute an optical waveguide coupling with a straight line-waveguide at one end of the optical waveguide without axial deviation and with a low loss and, at the same time, coupling with an optical waveguide at the other end of the optical waveguide in a state where the axial deviation of the mode center of light from the geometrical center of an optical waveguide core occurs.

An end having a curvature of zero can be suitably joined with a coupling end of a branching section (a 1-ch side in the case of a 1×2 branching section) other than a straight line-optical waveguide. At the joining part, an optical waveguide having a smaller variation upon production and higher yield than those in the case where a conventional curved optical waveguide requiring axial deviation is used can be obtained. Furthermore, a good optical waveguide can be provided in a wide wavelength range.

An end having a finite curvature can be suitably joined with a branching end of a branching section (a 2-ch side in the case of a 1×2 branching section) other than a curved optical waveguide. At the joining part, the quantity of light leaking from the central portion of the root of the branch can be reduced even in the case where a narrow width part of the root of the branch is a finite gap. As a result, a branching excessive loss can be reduced.

In addition, in the present invention, the length of an optical waveguide can be shortened because a non-S-shape curved optical waveguide is used. In addition, a branching ratio is stabilized upon branching, and a branching direction can be converted. As a result, a large scale integration of a splitter can be efficiently realized in a small space.

Furthermore, the curved optical waveguide of the present invention can be expressed by using a simple function. Accordingly, a mask for producing the optical waveguide or a forming die for producing the optical waveguide can be easily produced by using general CAD. Furthermore, the optical waveguide can be easily designed by using general simulation software.

As described above, the curved optical waveguide of the present invention has a facilitating effect on an entire process for an optical waveguide including the design of the optical waveguide, the preparation of a mask for the optical waveguide, and the production of the optical waveguide. In addition, good performance of an optical waveguide completed by using the curved optical waveguide can be realized.

BEST MODE FOR CARRYING OUT THE INVENTION

A curved optical waveguide in a first aspect of the invention comprises a core and a clad, and is characterized in that the core shape of the curved optical waveguide has no reversal of a curvature on a halfway; and curvatures at both ends of the curved optical waveguide gradually approach zero.

In addition, a curved optical waveguide of a second aspect of the invention comprises a core and a clad, and is characterized in that the core shape of the curved optical waveguide has no reversal of a curvature on a halfway; a curvature at one end of the curved optical waveguide gradually approaches zero; and a radius of curvature at the other end of the curved optical waveguide is finite.

The curved optical waveguide of the first aspect of the invention can be realized by using, for example, a function defined by the following equation [I]:

$$y = \sin \pi z \quad \text{[I]}$$

wherein y and z represent coordinate axes perpendicular to each other on a plane where the optical waveguide is present.

In the equation [I], a coordinate system is shown through such normalization that the coordinates (z, y) of a starting point are (0, 0) and the coordinates (z, y) of an end point are (1, 0). The coordinate system can be used after it has been enlarged or reduced in a y direction or z direction as required. Alternatively, the coordinate system can be used after its orientation has been changed or inverted as required.

In addition, the curved optical waveguide of the first aspect of the invention can be realized by using a function defined by the following equation [II]:

$$y = z - [(1/\pi) \sin \pi z] \quad \text{[II]}$$

wherein y and z represent coordinate axes perpendicular to each other on a plane where the optical waveguide is present.

In the equation [II], a coordinate system is shown through such normalization that the coordinates (z, y) of a starting point are (0, 0) and the coordinates (z, y) of an end point are (1, 1). The coordinate system can be used after it has been enlarged or reduced in a y direction or z direction as required. Alternatively, the coordinate system can be used after its orientation has been changed or inverted as required.

In addition, the curved optical waveguide of the first aspect of the invention can be realized by using a function defined by the following equation [III]:

$$y = z - [(a/\pi) \sin \pi z] \quad \text{[III]}$$

wherein y and z represent coordinate axes perpendicular to each other on a plane where the optical waveguide is present, and a represents a real number except zero. The equation [III] coincides with the equation [II] when a=1. In the equation [III], a coordinate system is shown through such normalization that the coordinates (z, y) of a starting point are (0, 0) and the coordinates (z, y) of an end point are (1, 1). The coordinate system can be used after it has been enlarged or reduced in a y direction or z direction as required. Alternatively, the coordinate system can be used after its orientation has been changed or inverted as required.

In addition, the curved optical waveguide of the second aspect of the invention can be realized by using, for example, a function defined by the following equation [IV]:

$$y = 1 - \cos[(\pi/2)z] \quad \text{[IV]}.$$

In the equation, a coordinate system is shown through such normalization that the coordinates (z, y) of a starting point are (0, 0) and the coordinates (z, y) of an end point are (1, 1). The coordinate system can be used after it has been enlarged or reduced in a y direction or z direction as required. Alternatively, the coordinate system can be used after its orientation has been changed or inverted as required. When the function is represented in the form of the equation [IV], z=0 means an end having a finite radius of curvature, and z=1 means an end whose curvature gradually approaches zero.

In addition, the curved optical waveguide of the second aspect of the invention can be realized by using a function defined by the following equation [V]:

$$y = (1-t)f(z) + t\{1 - \cos[(\pi/2)z]\} \quad \text{[V]}$$

wherein y and z represent coordinate axes perpendicular to each other on a plane where the optical waveguide is present, f(z) represents a continuous function of z which satisfies the relationships of f(0)=0, f(1)=1, f"(0)=0, and f"(1)=0. f"(z) represents the second differential function of f(z) with respect to z, and t represents a real number except zero.

In the equation, a coordinate system is shown through such normalization that the coordinates (z, y) of a starting point are (0, 0) and the coordinates (z, y) of an end point are (1, 1). The coordinate system can be used after it has been enlarged or reduced in a y direction or z direction as required. Alternatively, the coordinate system can be used after its orientation has been changed or inverted as required. When the function is represented in the form of the equation [V], z=0 means an end having a finite radius of curvature, and z=1 means an end whose curvature gradually approaches zero.

In addition, the curved optical waveguide of the second aspect of the invention can be realized by using a function defined by the following equation [VI]:

$$y = (1-t)z + t\{1 - \cos[(\pi/2)z]\} \quad \text{[VI]}$$

wherein y and z represent coordinate axes perpendicular to each other on a plane where the optical waveguide is present, and t represents a real number except zero. The equation [V] becomes the equation [VI] when f(z)=z. In the equation [VI], a coordinate system is shown through such normalization that the coordinates (z, y) of a starting point are (0, 0) and the coordinates (z, y) of an end point are (1, 1). The coordinate system can be used after it has been enlarged or reduced in a y direction or z direction as required. Alternatively, the coordinate system can be used after its orientation has been changed or inverted as required. When the function is represented in the form of the equation [VI], z=0 means an end having a finite radius of curvature, and z=1 means an end whose curvature gradually approaches zero.

Furthermore, the curved optical waveguide of the second aspect of the invention can be realized by using a function defined by the following equation [VII]:

$$y = (1-t)[z - (a/\pi)\sin \pi z] + t[1 - \cos[(\pi/2)z]] \quad \text{[VII]}$$

wherein y and z represent coordinate axes perpendicular to each other on a plane where the optical waveguide is present, and t and a each represent a real number except zero. The equation [V] becomes the equation [VII] when f(z)=z−(a/π) sin πz. In the equation [VII], a coordinate system is shown through such normalization that the coordinates (z, y) of a starting point are (0, 0) and the coordinates (z, y) of an end point are (1, 1). The coordinate system can be used after it has been enlarged or reduced in a y direction or z direction as required. Alternatively, the coordinate system can be used after its orientation has been changed or inverted as required. When the function is represented in the form of the equation [VII], z=0 means an end having a finite radius of curvature, and z=1 means an end whose curvature gradually approaches zero.

The curved optical waveguide of the first aspect of the invention can be produced by using a mask for producing a curved optical waveguide the core shape of which has no reversal of a curvature on a halfway, the mask having a pattern characterized in that curvatures at both ends of the curved optical waveguide gradually approach zero.

The curved optical waveguide of the second aspect of the invention can be produced by using a mask for producing a curved optical waveguide having a non-S-shape core shape having a pattern with no reversal of the symbol (i.e. "+" or "−") of a curvature on a halfway, the mask being characterized in that a curvature at one end of the pattern gradually approaches zero, and a radius of curvature at the other end of the pattern is finite.

The curved optical waveguide of the present invention can be similarly produced by using the above-described mask according to a known procedure for a conventional curved optical waveguide. For example, after a layer composed of a core material (described later) has been provided onto a clad, a photosensitive resist layer is provided onto the layer, the above mask is mounted on the resultant, and the whole is subjected to exposure and development. Thus, a core having the shape of the curved optical waveguide of the present invention is formed. Any one of conventionally known materials may be used for the mask.

An optical waveguide can be constituted by optically connecting the curved optical waveguide of the present invention and an optical waveguide having a different core shape. In addition, an optical waveguide can be constituted by optically connecting the curved optical waveguide of the present invention and an optical waveguide having a different core shape making their geometrical central axes aligned with each other. Potential examples of the optical waveguide having the different core shape include branching section of the optical waveguides. An example of the branching section of the optical waveguides is a branching section of the optical waveguide made by optically connecting an inlet of the branching section of the optical waveguide with one end of the curved optical waveguide according to the first aspect of the invention.

Another example of the branching section of the optical waveguides is a branching section of the optical waveguide made by optically connecting an outlet of the branching section of the optical waveguide with an end of the curved optical waveguide according to the second aspect of the invention having a finite radius of curvature. Furthermore, a specific potential example of the branching section of the optical waveguides is a non-S-shape curved optical waveguide obtained by optically connecting the curved optical waveguide of the first aspect of the invention and the curved optical waveguide of the second aspect of the invention.

The core shape of a non-S-shape curved optical waveguide having a curvature at one end gradually approaches zero and having a radius of curvature at the other end is finite is represented by, for example, any one of the following equations:

$$y=1-\cos[(\pi/2)z] \qquad [IV]$$

wherein y and z represent coordinate axes perpendicular to each other on a plane where the optical waveguide is present;

$$y=(1-t)f(z)+t\{1-\cos[(\pi/2)z]\} \qquad [V]$$

wherein y and z represent coordinate axes perpendicular to each other on a plane where the optical waveguide is present, f(z) represents a continuous function of z which satisfies the relationships of f(0)=0, f(1)=1, f"(0)=0, and f"(1)=0 where f"(z) represents the second differential function of f(z) with respect to z, and t represents a real number except zero;

$$y=(1-t)z+t\{1-\cos[(\pi/2)z]\} \qquad [VI]$$

wherein y and z represent coordinate axes perpendicular to each other on a plane where the optical waveguide is present, and t represents a real number except zero; and $$y=(1-t)[z-(a/\pi)\sin \pi z]+t\{1-\cos[(\pi/2)z]\} \qquad [VII]$$

wherein y and z represent coordinate axes perpendicular to each other on a plane where the optical waveguide is present, and t and a each represent a real number except zero.

Next, the present invention will be described in more detail on the basis of the accompanying drawings. FIG. 1 is a view showing junctions with straight line-optical waveguides at both ends of the curved optical waveguide as a first aspect of the invention. In FIG. 1, straight line-optical waveguide core parts 11 and 12 of the first aspect of the invention are connected with both ends B and B of a curved optical waveguide core part 1. A radius of curvature at each of the both ends B and B of the curved optical waveguide 1 of the first aspect of the invention gradually approaches infinity (a curvature is zero). FIG. 2 is a view showing junctions with straight line-optical waveguides at both ends of a conventional curved optical waveguide. In FIG. 2, the straight line-optical waveguide core parts 11 and 12 are connected with both ends A and A of a conventional curved optical waveguide core part 20. A radius of curvature at each of the both ends A and A of the conventional curved optical waveguide 10 is finite.

FIG. 3 is a view showing junctions with straight line-optical waveguides at both ends of the curved optical waveguide as a second aspect of the invention. In FIG. 3, the straight line-optical waveguide core parts 11 and 12 are connected with both ends A and B of a curved optical waveguide core part 21 of the second aspect of the invention. A radius of curvature at the end A of the curved optical waveguide 21 of the second aspect of the invention is finite, and a radius of curvature at the end B of the curved optical waveguide 21 gradually approaches infinity (a curvature is zero).

FIGS. 1, 2, and 3 each show a constitution example in which both ends are connected with straight line-optical waveguides favorably (with a low excessive loss). Since an optical center is offset at the end A, the central parts of the curved optical waveguide and the straight line-optical waveguide must be deviated from each other at the junction of the curved optical waveguide with the straight line-optical waveguide. In contrast, the curved optical waveguide and the straight line-optical waveguide can be connected with their centers aligned with each other at the junction between the curved optical waveguide and the straight line-optical waveguide because the optical center is not offset at the end B.

As described above, the curved optical waveguide of the present invention can be expressed by using a simple function. Accordingly, a mask for producing the optical waveguide or a forming die for producing the optical waveguide can be easily prepared by using general CAD.

Furthermore, the optical waveguide can be easily designed by means of general simulation software.

Some routines of simulation software may have difficulty with an operation for the rotation of an optical waveguide partial structure. In such cases, the use of the curved optical waveguide of the foregoing equation [II] can easily provide an optical waveguide parallel with a z direction at its inlet and having an angle of θ relative to the z direction at its outlet. Furthermore, the use of the curved optical waveguide of the foregoing equation [III] can easily provide an optical waveguide having an angle of θ1 relative to a z direction at its inlet and an angle of θ2 relative to the z direction at its outlet.

In addition, the use of the curved optical waveguide of the foregoing equation [V] can easily provide an optical waveguide parallel with a z direction at its inlet and having an angle of θ relative to the z direction at its outlet. Furthermore, the use of the curved optical waveguide of the foregoing equation [VI] can easily provide an optical waveguide having an angle of θ1 relative to a z direction at its inlet and an angle of θ2 relative to the z direction at its outlet.

The foregoing will be additionally described below.

(i) In the case of the equation [I] (see FIG. 4)

$$y'=\pi \cos \pi z$$

When z=0 (inlet), the gradient of a tangent is y'=tan θ=π (left end in FIG. 4).

When z=1 (outlet), the gradient of a tangent is y'=tan θ=−π (right end in FIG. 4).

The number "π" itself makes no sense because the original equation may be multiplied by a constant. It should be noted that both ends slant from the z-axis direction (θ≠0).

(ii) In the case of the equation [II] (see FIG. 5)

$$y'=1-\cos \pi z$$

When z=0 (inlet), the gradient of a tangent is y'=tan θ=0. That is, θ=0 (left end in FIG. 5).

When z=1 (outlet), the gradient of a tangent is y"=tan θ=2 (right end in FIG. 5).

The number "2" itself makes no sense because the original equation may be multiplied by a constant. It should be noted that the equation is useful because the tangent is parallel with the z-axis direction at a starting point and the tangent slants from the z-axis at an end point (θ≠0). The equation is convenient for, for example, the case where one wishes to connect an optical waveguide with a straight line parallel with the z-axis to slant toward an outlet.

(iii) In the case of the equation [III] (see FIG. 6)

$$y'=1-a\cdot\cos \pi z$$

When z=0 (inlet), the gradient of a tangent is y'=tan θ1=1−a (left end in FIG. 6).

When z=1 (outlet), the gradient of a tangent is y'=tan θ2=1+a (right end in FIG. 6).

The numbers "1−a" and "1+a" themselves make no sense because the original equation may be multiplied by a constant. It should be noted that the equation is useful because the equation can provide a curve slanted by θ1 relative to the z-axis direction at a starting point and slanted by θ2 relative to the z-axis direction at an end point. The equation is convenient for, for example, the case where one wishes to connect an optical waveguide with an optical waveguide having a certain gradient of θ1 relative to the z-axis to slant toward an outlet by θ2. The equation [III] coincides with the equation [II] when a=1.

(iv) In the case of the equation [IV] (see FIG. 5)

$$y'=(\pi/2)\sin [(\pi/2)z]$$

When z=0 (inlet), the gradient of a tangent is y'=tan θ=0. That is, θ=0 (left end in FIG. 5).

When z=1 (outlet), the gradient of a tangent is y'=tan θ=π/2 (right end in FIG. 5).

The number "π/2" itself makes no sense because the original equation may be multiplied by a constant. It should be noted that the equation is useful because the tangent is parallel with the z-axis direction at a starting point and the tangent slants from the z-axis at an end point (θ≠0). The equation is convenient for, for example, the case where one wishes to connect an optical waveguide with a branching section parallel with the z-axis to slant toward an outlet.

(v) In the case of the equation [V] (see FIG. 6)

$$y'=(1-t)f'(z)-t(\pi/2)\sin [(\pi/2)z]$$

When z=0 (inlet), the gradient of a tangent is y'=tan θ1= (1−t)f'(0) (left end in FIG. 6).

When z=1 (outlet), the gradient of a tangent is y'=tan θ2= (1−t)f'(1)+t(π/2) (right end in FIG. 6).

The numbers "(1−t)f'(0)" and "(1−t)f'(1)+t(π/2)" themselves make no sense because the original equation may be multiplied by a constant. It should be noted that the equation is useful because the equation can provide a curve slanted by θ1 relative to the z-axis direction at a starting point and slanted by θ2 relative to the z-axis direction at an end point. The equation is convenient for, for example, the case where one wishes to connect an optical waveguide with an optical waveguide having a certain gradient of θ1 relative to the z-axis to slant toward an outlet by θ2. The equation [V] coincides with the equation [IV] when t=1.

(vi) In the case of the equation [VI] (see FIG. 6)

The case corresponds to the case where f(z)=z in the equation [V]. Accordingly, f'(z)=1, and f'(0)=f'(1)=1. Therefore, the following relationships are established.

When z=0 (inlet), the gradient of a tangent is y'=tan θ1=1−t (left end in FIG. 6).

When z=1 (outlet), the gradient of a tangent is y'=tan θ2= (1−t)+t(π/2) (right end in FIG. 6).

The numbers "(1−t)" and "(1−t)+t(π/2)" themselves make no sense because the original equation may be multiplied by a constant. It should be noted that the equation is useful because the equation can provide a curve slanted by θ1 relative to the z-axis direction at a starting point and slanted by θ2 relative to the z-axis direction at an end point. The equation is convenient for, for example, the case where one wishes to connect an optical waveguide with an optical waveguide having a certain gradient of θ1 relative to the z-axis to slant toward an outlet by θ$_2$. The equation [VI] coincides with the equation [IV] when t=1.

(vii) In the case of the equation [VII] (see FIG. 6)

The case corresponds to the case where f(z)=z−(a/π)sin πz in the equation [V]. Accordingly, f'(z)=1−a·cos πz, f'(0)=1−a, and f'(1)=1+a. Therefore, the following relationships are established.

When z=0 (inlet), the gradient of a tangent is y'=tan θ1= (1−t)(1−a) (left end in FIG. 6).

When z=1 (outlet), the gradient of a tangent is y'=tan θ2= (1−t) (1+a)+t(π/2) (right end in FIG. 6).

The numbers "(1−t)(1−a)" and "(1−t)(1+a)+t(π/2)" themselves each make no sense because the original equation may be multiplied by a constant. It should be noted that the equation is useful because the equation can provide a curve slanted by θ1 relative to the z-axis direction at a starting point and slanted by θ2 relative to the z-axis direction at an endpoint. The equation is convenient for, for example, the case where one wishes to connect an optical waveguide with an optical waveguide having a certain gradient of θ1 relative to the z-axis to slant toward an outlet by θ2. The equation [VII] coincides with the equation [IV] when a=1.

FIG. 7 is a view showing an example of the effective utilization of the ends B of the curved optical waveguide shown in FIG. 1. In FIG. 7, one end of the curved optical waveguide 1 of the first aspect of the invention is connected with the straight line-optical wave guide core part 11, and an inlet of a branching section core part 31 is connected with the other end of the curved optical waveguide 1 of the first aspect of the invention. FIG. 8 is a view showing an example of the other effective utilization of the ends of the curved optical waveguide shown in FIG. 1 different from that shown in FIG. 7. In FIG. 8, the end B of the curved optical waveguide core part 21 of the second aspect of the invention shown in FIG. 3 is connected with one end of the curved optical waveguide core part 1 of the first aspect of the invention, and the straight line-waveguide core part 12 is connected with the other end of the curved optical waveguide core part 1 of the first aspect of the invention. FIG. 9 is a view showing an example of the other effective utilization of the ends B of the curved optical waveguide shown in FIG. 1 different from that shown in FIG. 8. In FIG. 9, a multi-mode optical waveguide 41 is connected with one end of each of curved optical waveguide core parts 1 to 4 of the first aspect of the invention.

FIG. 10 is a view showing an example of the other effective utilization of the ends of the curved optical waveguide shown in FIG. 1 different from that shown in FIG. 9. That is, the core part of an ordinary optical fiber 42 is connected with one end of the curved optical waveguide core part 1 of the first aspect of the invention. FIG. 11 is a view showing an example of the other effective utilization of the ends of the curved optical waveguide shown in FIG. 1 different from that shown in FIG. 10. That is, an ordinary guide groove 43 for an optical fiber is connected with one end of the curved optical waveguide core part 1 of the first aspect of the invention.

FIG. 12 is a view showing an example of the effective utilization of the end A of the curved optical waveguide shown in FIG. 3. In FIG. 12, the branching section core part 31 is connected with the straight line-optical waveguide core part 11. Ends A of curved optical waveguide core parts 21 and 22 of the second aspect of the invention each having a finite radius of curvature are connected with output parts of the branching section core part 31. The straight line-optical waveguide core part 12 is connected with the end B of the curved optical waveguide core part 22 of the second aspect of the invention whose radius of curvature gradually approaches infinity (a curvature is zero). FIG. 13 is a view showing an example of the other effective utilization of the end A of the curved optical waveguide shown in FIG. 3 different from that shown in FIG. 12. FIG. 13 shows an example in which the curved optical waveguide of the second aspect of the invention is disposed near a reflection structure. The curved optical waveguide core parts 21 and 22 of the second aspect of the invention are connected with a reflector 48 such as a filter or a metal mirror including a half mirror for reflecting specific light at the ends A each having a finite radius of curvature.

FIG. 14 is a view showing an example of the effective utilization of the end B of the curved optical waveguide shown in FIG. 3. FIG. 14 shows the same structure as that shown in FIG. 12. In FIG. 14, the straight line-optical waveguide core part 12 is connected with the end B of the curved optical waveguide core part 22 of the second aspect of the invention whose radius of curvature gradually approaches infinity (a curvature is zero). FIG. 15 is a view showing an example of the other effective utilization of the end B of the curved optical waveguide shown in FIG. 3 different from that shown in FIG. 12. In FIG. 15, the branching section core part 31 is connected with the end B of the curved optical waveguide core part 21 of the second aspect of the invention whose radius of curvature gradually approaches infinity (a curvature is zero).

FIG. 16 is a view showing an example of the other effective utilization of the end B of the curved optical waveguide shown in FIG. 3 different from that shown in FIG. 15. In FIG. 16, the end B of the curved optical waveguide core part 1 of the first aspect of the invention is connected with the end B of the curved optical waveguide core part 21 of the second aspect of the invention whose radius of curvature gradually approaches infinity (a curvature is zero). The other end B of the curved optical waveguide core part 21 of the second aspect of the invention shown in FIG. 16 is connected with the straight line-optical waveguide core part 12. FIG. 17 is a view showing an example of the other effective utilization of the end B of the curved optical waveguide shown in FIG. 3 different from that shown in FIG. 16. That is, the core part of the ordinary optical fiber 42 is connected with the end B of the curved optical waveguide core part 21 of the second aspect of the invention whose radius of curvature gradually approaches infinity (a curvature is zero). FIG. 18 is a view showing an example of the other effective utilization of the end B of the curved optical waveguide shown in FIG. 3 different from that shown in FIG. 17. That is, the ordinary guide groove 43 for an optical fiber is connected with the end B of the curved optical waveguide core part 21 of the second aspect of the invention whose radius of curvature gradually approaches infinity (a curvature is zero).

FIG. 19 is a view showing an embodiment of an optical splitter using the curved optical waveguide of the first aspect of the invention as an example of an optical device of the present invention. In FIG. 19, an optical splitter 200 as the optical device of the present invention is constituted as follows: an optical waveguide is constituted by disposing curved optical waveguides represented by broken lines and each having the core shape of FIG. 3, that is, curved optical waveguide core parts 21 to 26 of the second aspect of the invention optically connected with curved optical waveguides 1 to 6 of the first aspect of the invention represented by solid lines, and branching section of the optical waveguides 31 to 33 and guide grooves 43 to 47 for optical fibers are additionally connected. FIG. 20 is also a view showing another embodiment of an optical splitter using the curved optical waveguide of the present invention different from that shown in FIG. 19. That is, an optical splitter 201 is constituted by disposing the branching section of the optical waveguides 31 to 33 connected with the curved optical waveguides 1 and 2 of the first aspect of the invention represented by solid lines and the curved optical waveguides 21 to 24 of the second aspect of the invention represented by broken lines; and additionally connecting the guide grooves 43 to 47 for optical fibers.

Optical waveguides and the like have only to be optically connected, and a gap or an adhesive layer may be provided as required to the extent that a great loss does not occur. In this case, the range of the application of the curved optical waveguide of the present invention expands.

The core and/or the clad in the optical waveguide of the present invention is preferably partly or entirely composed of a polymer. Furthermore, the polymer is preferably a polyimide-based resin containing fluorine.

Examples of materials for a core and a clad constituting the optical waveguide of the present invention include various materials including: inorganic materials such as a glass and a semiconductor material; and organic materials such as a resin. Of those, a polymer such as a resin is preferable because it can be easily processed in a short time period by means of dry etching or the like. It should be noted that a cavity can be used as part or entirety of a clad. Any polymer can be used as such polymer, and specific examples thereof include: a polyimide-based resin (such as a polyimide resin, a poly(imide-isoindoloquinazolinedioneimide) resin, a polyether-imide resin, a polyether-ketone resin, or a polyester imide resin); a silicone-based resin; an acrylic resin; a polystyrene-based resin; a polycarbonate-based resin; a polyamide-based resin; a polyester-based resin; a phenol-based resin; a polyquinoline-based resin; a polyquinoxaline-based resin; a polybenzoxazole-based resin; a polybenzothiazole-based resin; a polybenzoimidazole-based resin; and a resin for photobleaching (such as polysilane described in JP-A-2001-296438, a silicone resin containing a nitron compound, polymethyl methacrylate containing DMAPN {(4-N,N-dimethylaminophenyl)-N-phenylnitron}, a dye polymer, a polyimide resin or epoxy resin containing a nitron compound, or a hydrolyzable silane compound described in JP-A-2000-66051). Each of the above resins may have a fluorine atom. Examples of a preferable polymer include polyimide resins because of their high glass transition temperatures (Tg) and excellent heat resistance. Of those, a polyimide-based resin containing fluorine is particularly preferable because of its transmissivity and refractive index property.

Examples of the polyimide-based resin containing fluorine include a polyimide resin containing fluorine, a poly (imide•isoindoloquinazolinedioneimide) resin containing fluorine, a polyether-imide resin containing fluorine, and a polyamide-imide resin containing fluorine.

A precursor solution for the polyimide-based resin containing fluorine can be prepared by causing a tetracarboxylic dianhydride and a diamine to react with each other in a polar solvent such as: N-methyl-2-pyrrolidone; N,N-dimethylacetamide; γ-butyrolactone; or dimethyl sulfoxide. Each of the tetracarboxylic dianhydride and the diamine may contain fluorine, or only one of them may contain fluorine.

In addition, a precursor solution for the polyimide-based resin free of fluorine can be prepared by causing a tetracarboxylic dianhydride free of fluorine and a diamine free of fluorine to react with each other in a polar solvent such as: N-methyl-2-pyrrolidone; N,N-dimethylacetamide; γ-butyrolactone; or dimethyl sulfoxide.

Examples of an acid dianhydride containing fluorine include: (trifluoromethyl)pyromellitic dianhydride; di(trifluoromethyl)pyromellitic dianhydride; di(heptafluoropropyl)pyromellitic dianhydride; pentafluoroethyl pyromellitic dianhydride; bis{3,5-di(trifluoromethyl)phenoxy}pyromellitic dianhydride; 2,2-bis(3,4-dicarboxyphenyl)hexafluoropropane dianhydride; 5,5'-bis(trifluoromethyl)-3,3',4,4'-tetracarboxybiphenyl dianhydride; 2,2',5,5'-tetrakis(trifluoromethyl)-3,3',4,4'-tetracarboxybiphenyl dianhydride; 5,5'-bis(trifluoromethyl)-3,3',4,4'-tetracarboxydiphenyl ether dianhydride; 5,5'-bis(trifluoromethyl)-3,3',4,4'-tetracarboxybenzophenone dianhydride; bis{(trifluoromethyl)dicarboxyphenoxy}benzene dianhydride; bis{(trifluoromethyl)dicarboxyphenoxy}(trifluoromethyl)benzene dianhydride; bis(dicarboxyphenoxy)(trifluoromethyl)benzene dianhydride; bis(dicarboxyphenoxy)bis(trifluoromethyl)benzene dianhydride; bis(dicarboxyphenoxy)tetrakis(trifluoromethyl)benzene dianhydride; 2,2-bis{(4-(3,4-dicarboxyphenoxy)phenyl}hexafluoropropane dianhydride; bis{(trifluoromethyl)dicarboxyphenoxy}biphenyl dianhydride; bis{(trifluoromethyl)dicarboxyphenoxy}bis(trifluoromethyl)biph enyl dianhydride; bis{(trifluoromethyl)dicarboxyphenoxy}diphenyl ether dianhydride; and bis(dicarboxyphenoxy)bis(trifluoromethyl)biphenyl dianhydride.

Examples of the diamine containing fluorine include: 4-(1H,1H,11H-eicosafluoroundecanoxy)-1,3-diaminobenzene; 4-(1H,1H-perfluoro-1-butanoxy)-1,3-diaminobenzene; 4-(1H,1H-perfluoro-1-heptanoxy)-1,3-diaminobenzene; 4-(1H,1H-perfluoro-1-octanoxy)-1,3-diaminobenzene; 4-pentafluorophenoxy-1,3-diaminobenzene; 4-(2,3,5,6-tetrafluorophenoxy)-1,3-diaminobenzene; 4-(4-fluorophenoxy)-1,3-diaminobenzene; 4-(1H,1H,2H,2H-perfluoro-1-hexanoxy)-1,3-diaminobenzene; 4-(1H,1H,2H,2H-perfluoro-1-dodecanoxy)-1,3-diaminobenzene; 2,5-diaminobenzotrifluoride; bis(trifluoromethyl)phenylenediamine; diaminotetra(trifluoromethyl)benzene; diamino(pentafluoroethyl)benzene; 2,5-diamino(perfluorohexyl)benzene; 2,5-diamino(perfluorobutyl)benzene; 2,2'-bis(trifluoromethyl)-4,4'-diaminobiphenyl; 3,3'-bis(trifluoromethyl)-4,4'-diaminobiphenyl; ocafluorobenzidine; 4,4'-diaminodiphenyl ether; 2,2-bis(p-aminophenyl)hexafluoropropane; 1,3-bis(anilino)hexafluoropropane; 1,4-bis(anilino)octafluorobutane; 1,5-bis(anilino)decafluoropentane; 1,7-bis(anilino)tetradecafluoroheptane; 2,2'-bis(trifluoromethyl)-4,4'-diaminodiphephenyl ether; 3,3',5,5'-tetrakis(trifluoromethyl)-4,4'-diaminodiphenyl ether; 3,3'-bis(trifluoromethyl)-4,4'-diaminobenzophenone; 4,4'-diamino-p-terphenyl; 1,4-bis(p-aminophenyl)benzene; p-bis(4-amino-2-trifluoromethylphenoxy)benzene; bis(aminophenoxy)bis(trifluoromethyl)benzene; bis(aminophenoxy)tetrakis(trifluoromethyl)benzene; 2,2-bis{4-(4-aminophenoxy)phenyl}hexafluoropropane; 2,2-bis{4-(3-aminophenoxy)phenyl}hexafluoropropane; 2,2-bis{4-(2-aminophenoxy)phenyl}hexafluoropropane; 2,2-bis{4-aminophenoxy)-3,5-dimethylphenyl}hexafluoropropane; 2,2-bis{4-(4-aminophenoxy)-3,5-ditrifluoromethylphenyl}hexafluoropropane; 4,4'-bis(4-amino-2-trifluoromethylphenoxy)biphenyl; 4,4'-bis(4-amino-3-trifluoromethylphenoxy)biphenyl; 4,4'-bis(4-amino-2-trifluoromethylphenoxy)diphenylsulfone; 4,4'-bis(3-amino-5-trifluoromethylphenoxy)diphenylsulfone; 2,2-bis{4-(4-amino-3-trifluoromethylphenoxy)phenyl}hexafluoropropane; bis{(trifluoromethyl)aminophenoxy}biphenyl; bis[{(trifluoromethyl)aminophenoxy}phenyl]hexafluoropropane; and bis{2-[(aminophenoxy)phenyl]hexafluoroisopropyl}benzene.

Two or more kinds of the above tetracarboxylic dianhydrides and diamines may be used in combination. A solution having photosensitivity can be used as a precursor solution for a polyimide-based resin.

The precursor solution for a polyimide-based resin is applied to the surface of a substrate by means of, for example, a spinner or printing, and is subjected to a heat treatment at a final temperature of 200 to 400° C. for curing. Thus, a polyimide-based resin coating is obtained.

An optical device of the present invention is constituted by means of the optical waveguide according to any one of the above items (1) to (30). Examples of such optical device include an optical splitter, a directional optical coupler, an optical coupler, an optical coupling and branching device, an optical multiplexing and branching filter, an optical transmitter module, an optical receiver module, an optical transmitter/receiver module, an optical switch, an optical modulator, an optical filter, an optical polarizer, an optical dispersion compensator, an optical add-drop module, and an optical cross-connect.

EXAMPLES

Next, the present invention will be described in more detail by examples. However, the present invention is not limited by these examples at all.

Example 1

Evaluation about an excessive loss at a curved part in the present invention was performed as described below (input wavelengths of 1.31 μm and 1.55 μm).

The optical waveguides 1 to 4 of the first aspect of the invention each having a curve expressed by the function of the equation [II] as a central line were disposed by connecting as shown in FIG. 21. At this time, a length in a z-axis direction was 2.6775 mm, and a length in the direction perpendicular to a z-axis was 0.125 mm. To be specific, the resultant was enlarged or reduced in a z direction or x direction in such a manner that the equation [II] would be expressed in the form of the following equation [X]. Thus, the shape of an optical waveguide was obtained.

Trajectory of the central line of an optical waveguide:

$$x/\text{height} = z/\text{length} - \sin[\pi(z/\text{length})]/\pi \quad [X]$$

where height=0.125 mm and length=2.6775 mm.

No offset was provided for every junction between middle and intervening sections. In addition, the optical waveguides were disposed in such a manner that the tangents of both curves would be substantially parallel with each other at the junction. Furthermore, input/output sections outside the intervening sections were connected with the optical waveguides 11 and 12 each having a straight line parallel with the z-axis direction as a central line and each having a length of 0.1 mm. In addition, no offset was provided for every junction between input/output and intervening sections. The optical waveguide constituted as shown in FIG. 21 had a total length of 10.91 mm in the z-axis direction and a vibration width of 0.25 mm in an x-axis direction. The optical waveguide constituted as described above had an excessive loss of −0.004 dB (for an input wavelength of 1.31 μm) or −0.003 dB (for an input wavelength of 1.55 μm).

Comparative Example 1

For comparison, an optical waveguide having a total length of 10.91 mm in a z-axis direction and a vibration width of 0.25 mm in an x-axis direction was constituted in the same manner as in Example 1 except that a circular arc was used instead of the curve of the equation [II]. In addition, as in the case of Example 1, all circular-arc optical waveguides used for middle sections and intervening sections each had a length of 2.6775 mm in the z-axis direction. No offset was provided for every junction between middle and intervening sections. In addition, no offset was provided for every junction between input/output and intervening sections. The optical waveguide constituted as described above had an excessive loss of −0.059 dB (for an input wavelength of 1.31 μm) or −0.095 dB (for an input wavelength of 1.55 μm). The optical waveguide of this comparative example showed an excessive loss larger than that of Example 1.

Comparative Example 2

For comparison, an optical waveguide having a total length of 10.91 mm in a z-axis direction and a vibration width of 0.25 mm in an x-axis direction was constituted in the same manner as in Comparative Example 1 except that an offset of 0.2 μm was provided for every junction between middle and intervening sections; and an offset of 0.1 μm was provided for every junction between input/output and intervening sections. The optical waveguide constituted as described above had an excessive loss of −0.013 dB (for an input wavelength of 1.31 μm) or −0.039 dB (for an input wavelength of 1.55 μm). The optical waveguide of this comparative example showed an excessive loss larger than that of Example 1. The excessive loss reduced owing to an effect of the offset at a wavelength of 1.31 μm, but the excessive loss did not sufficiently reduce at a wavelength of 1.55 μm. Thus, low losses were not able to be realized at both wavelengths simultaneously.

Comparative Example 3

For comparison, an optical waveguide having a total length of 10.91 mm in a z-axis direction and a vibration width of 0.25 mm in an x-axis direction was constituted in the same manner as in Comparative Example 1 except that an offset of 0.4 μm was provided for every junction between middle and intervening sections; and an offset of 0.2 μm was provided for every junction between input/output and intervening sections. The optical waveguide constituted as described above had an excessive loss of −0.013 dB (for an input wavelength of 1.31 μm) or −0.019 dB (for an input wavelength of 1.55 μm). The optical waveguide of this comparative example showed an excessive loss larger than that of Example 1. The excessive loss reduced owing to an effect of the offset at a wavelength of both 1.31 μm and 1.55 μm, but the excessive loss did not more sufficiently reduce than that of Example 1.

Comparative Example 4

For comparison, an optical waveguide having a total length of 10.91 mm in a z-axis direction and a vibration width of 0.25 mm in an x-axis direction was constituted in the same manner as in Comparative Example 1 except that an offset of 0.6 μm was provided for every junction between middle and intervening sections; and an offset of 0.3 μm was provided for every junction between input/output and intervening sections. The optical waveguide constituted as described above had an excessive loss of −0.060 dB (for an input wavelength of 1.31 μm) or −0.036 dB (for an input wavelength of 1.55 μm). The optical waveguide of this comparative example showed an excessive loss larger than that of Example 1. The excessive loss slightly reduced owing to an effect of the offset at a wavelength of 1.55 μm, but the excessive loss at a wavelength of 1.31 μm was comparable to that of Comparative Example 1 where no offset was provided. Thus, low losses were not able to be realized at both wavelengths simultaneously.

Comparative Example 5

For comparison, an optical waveguide having a total length of 10.91 mm in a z-axis direction and a vibration width of 0.25 mm in an x-axis direction was constituted in the same manner as in Comparative Example 1 except that an offset of 0.8 μm was provided for every junction between middle and intervening sections; and an offset of 0.4 μm was provided for every junction between input/output and intervening sections. The optical waveguide constituted as described above had an excessive loss of −0.155 dB (for an input wavelength of 1.31 μm) or −0.092 dB (for an input wavelength of 1.55 μm). The optical waveguide of this comparative example showed an excessive loss larger than that of Example 1. The excessive loss rather than increased owing to an adverse effect of the offset at a wavelength of 1.31 μm as compared to that of Comparative Example 1 where no offset was provided. A reducing effect on the excessive loss was slight at a wavelength of 1.55 μm. Thus, low losses were not able to be realized at both wavelengths simultaneously.

Table 1 summarizes the components, shapes, and results of losses about the optical waveguides used in the above Examples and Comparative Examples. As can be seen from Table 1, the loss of Example 1 at each of wavelengths of 1.31 μm and 1.55 μm was lower than that of any other Comparative Examples. In addition, an optical waveguide constituted by combining circular arcs was evaluated while an offset was variously changed for reducing a loss at a junction. However, low losses at both wavelengths were not able to be satisfied simultaneously. That is, it is found that a low loss cannot be realized in an entire wavelength range in an optical waveguide to be used at multiple wavelengths or an optical waveguide to be used in a wide wavelength range even in a case of offset connection.

measurement or the like in addition to the core pattern. A procedure for drawing by using CAD is as follows: for improving the efficiency of drawing work, a pattern for one

TABLE 1

| Item | Input/output section Waveguide shape | Junction Offset | Intervening section | | | Junction Offset | Middle Section | | | Total length | Wave-Length | Loss dB |
|---|---|---|---|---|---|---|---|---|---|---|---|---|
| | | | Waveguide shape | x width | z length | | Waveguide shape | x width | z length | | | |
| Example 1 | Straight Line | Absent | Equation II | 125 μm | 2,677.5 μm | Absent | Equation II | 125 μm | 2,677.5 μm | 1,0910 μm | 1.31 μm | −0.004 |
| | | | | | | | | | | | 1.55 μm | −0.003 |
| Comparative Example 1 | Straight Line | Absent | Circular arc | 125 μm | 2,677.5 μm | Absent | Circular arc | 125 μm | 2,677.5 μm | 1,0910 μm | 1.31 μm | −0.059 |
| | | | | | | | | | | | 1.55 μm | −0.095 |
| Comparative Example 2 | Straight Line | 0.1 μm | Circular arc | 125 μm | 2,677.5 μm | 0.2 μm | Circular arc | 125 μm | 2,677.5 μm | 1,0910 μm | 1.31 μm | −0.013 |
| | | | | | | | | | | | 1.55 μm | −0.039 |
| Comparative Example 3 | Straight Line | 0.2 μm | Circular arc | 125 μm | 2,677.5 μm | 0.4 μm | Circular arc | 125 μm | 2,677.5 μm | 1,0910 μm | 1.31 μm | −0.013 |
| | | | | | | | | | | | 1.55 μm | −0.019 |
| Comparative Example 4 | Straight Line | 0.3 μm | Circular arc | 125 μm | 2,677.5 μm | 0.6 μm | Circular arc | 125 μm | 2,677.5 μm | 1,0910 μm | 1.31 μm | −0.060 |
| | | | | | | | | | | | 1.55 μm | −0.036 |
| Comparative Example 5 | Straight Line | 0.4 μm | Circular arc | 125 μm | 2,677.5 μm | 0.8 μm | Circular arc | 125 μm | 2,677.5 μm | 1,0910 μm | 1.31 μm | −0.155 |
| | | | | | | | | | | | 1.55 μm | −0.092 |

Example 2

Next, the excessive loss of a 1×8 splitter having a constitution shown in FIG. 22 was calculated. In the figure, the optical waveguide of the present invention having a curve represented by the function of the equation [II] was used in a section 1 expressed by a solid line, the optical waveguides of the present invention each having a curve represented by the function of the equation [III] were used in sections 2 to 10 expressed by solid lines, curved optical waveguides each shown in FIG. 6 and straight line-optical waveguides were used in sections 51 to 64 expressed by dotted lines, and multi-mode optical waveguides were used in sections 34 to 40. When the optical waveguides of the present invention were used for connection, an average excessive loss was −9.53 dB (for an input wavelength of 1.31 μm) or −9.76 dB (for an input wavelength of 1.55 μm). Next, for comparison, the excessive loss of a 1×8 splitter having a constitution similar to that shown in FIG. 22 was calculated by using a conventional arc curve and a straight line. When an arc curved optical waveguide was used, an average excessive loss was −9.62 dB (for an input wavelength of 1.31 μm) or −9.91 dB (for an input wavelength of 1.55 μm). A beam propagation method (BPM) was employed for calculating an excessive loss. As described above, using the curved optical waveguide of the first aspect of the invention for connection between branching sections of the optical waveguides was able to reduce a loss.

In addition, a mask having the above core pattern was prepared as described below. Since the dimensions of a core pattern changed depending on a process, a core pattern taking the amounts of changes in dimensions into consideration was drawn by using CAD. The mask was added with an alignment mark for improving the accuracy of position between the mask and a substrate and any other marker for a use in pattern pixel is initially drawn, and the pattern for one pixel is arranged and copied so that the pattern is disposed on the entirety of the mask. The pattern for one pixel can be drawn by using a layer different from a layer which is provided with a layer and on which a core pattern is drawn. A pattern was directly plotted from the CAD drawing drawn as described above on a mask substrate by using an exposing device, whereby a mask in which a pattern part was filled with a Cr metal film and a mask in which a part except a pattern part was filled with a Cr metal film were prepared. The above two masks can be separately used depending on the kind of a resist to be used in a core pattern forming process and the kind of a core forming process in the production of an optical waveguide.

As described above, the 1×8 splitter constituted by using the curved optical waveguide of the first aspect of the invention showed an excessive loss lower than that of the conventional splitter constituted by using an S-shape curved optical waveguide having an arc coupling shape.

Example 3

An optical splitter having a curved optical waveguide having a schematic structure shown in FIG. 22 was produced by using the following materials.

Core: OPI-N3205 manufactured by Hitachi Chemical Co., Ltd.

Clad: OPI-N1005 manufactured by Hitachi Chemical Co., Ltd.

Production method; an organic zirconium chelate was applied by means of a spin coating method to a silicon wafer in which V grooves had been formed in such a manner that the chelate would have a thickness of 100 angstroms after drying. After the resultant had been dried, a polyimide resin free of fluorine was applied to the resultant in such a manner that the resin would have a thickness of 0.3 μm after drying. After the resultant had been dried, a lower clad layer (8 μm) and a core layer (6.5 μm) each composed of a polyimide resin containing fluorine were formed. Next, a silicon-containing resist was applied on the core layer to have a thickness of 0.5 μm, and was dried. The resultant was subjected to exposure and development through the core pattern of the mask prepared in Example 2. Then, reactive ion etching was performed through the resist pattern, whereby a core layer was formed. After the resist had been peeled, an upper clad layer (15 μm) was formed, whereby a polyimide optical waveguide was produced. After that, the resultant was cut into a chip by means of dicing.

The resultant optical waveguide was evaluated about an insertion loss. Upon evaluation, measurement was performed while an optical fiber was fixed by using the V grooves formed in both ends of the optical waveguide substrate as guides. Semiconductor laser having a wavelength of 1.31 μm was used as a light source. An average insertion loss when the curved optical waveguide of the first aspect of the invention was used was −11.8 dB (for an input wavelength of 1.31 μm) or −11.8 dB (for an input wavelength of 1.55 μm). An average insertion loss when an arc curved optical waveguide was used was −12.4 dB (for an input wavelength of 1.31 μm) or −12.3 dB (for an input wavelength of 1.55 μm).

As described above, the splitter having a 1×8 type tree constitution constituted by using the curved optical waveguide of the first aspect of the invention showed an insertion loss lower than that of the conventional splitter constituted by using the arc curved optical waveguide.

Example 4

Evaluation about an excessive loss at a curved part of the present invention was performed as described below (input wavelengths of 1.31 μm and 1.55 μm).

The optical waveguides 21 and 22 of the second aspect of the invention each having a curve represented by the function of the equation [IV] as a central line were disposed at a middle section by connecting with the end A each other as shown in FIG. 23. At this time, a length in a z-axis direction was 2.355 mm, and a length in the direction perpendicular to a z-axis was 0.125 mm. To be specific, the resultant was enlarged or reduced in a z direction or x direction in such a manner that the equation [IV] would be expressed in the form of the following equation [XI]. Thus, the shape of an optical waveguide was obtained.

Trajectory of the central line of an optical waveguide:

$$x/\text{height}=1-\cos[\pi(z/\text{length})/2] \quad [\text{XI}]$$

where height=0.125 mm and length=2.355 mm.

Next, the optical waveguides 1 and 2 of the first aspect of the invention each having a curve represented by the function of the equation [II] as a central line were connected to a intervening section. At this time, a length in a z-axis direction was 3 mm, and a length in the direction perpendicular to the z-axis was 0.125 mm. To be specific, the resultant was enlarged or reduced in the z direction or x direction in such a manner that the equation [II] would be expressed in the form of the following equation [XII]. Thus, the shape of an optical waveguide was obtained. Trajectory of the central line of an optical waveguide:

$$x/\text{height}=z/\text{length}-\sin[\pi(z/\text{length})/2]/\pi \quad [\text{XII}]$$

where height=0.125 mm and length=3 mm.

No offset was provided for every junction between middle and intervening sections. In addition, the lengths in the z-axis direction of the middle section and the intervening section were selected in such a manner that the tangents of both curves would be substantially parallel with each other at the junction. Furthermore, input/output sections outside the intervening sections were connected with the optical waveguides 11 and 12 each having a straight line parallel with the z-axis direction as a central line and each having a length of 0.1 mm. In addition, no offset was provided for every junction between input/output and intervening sections. The optical waveguide constituted as shown in FIG. 23 had a total length of 10.91 mm in the z-axis direction and a vibration width of 0.25 mm in an x-axis direction. The optical waveguide constituted as described above had an excessive loss of −0.004 dB (for an input wavelength of 1.31 μm) or −0.002 dB (for an input wavelength of 1.55 μm).

Comparative Example 6

For comparison, an optical waveguide having a total length of 10.91 mm in a z-axis direction and a vibration width of 0.25 mm in an x-axis direction was constituted in the same manner as in Example 4 except that a circular arc was used instead of a curve of the equation [IV] or the equation [II]. In addition, as in the case of Example 4, the lengths of middle sections and of intervening sections in a z-axis direction were selected in such a manner that the tangents of both curves would be substantially parallel with each other at a junction. To be specific, all circular-arc optical waveguides used for the middle sections and the intervening sections each had a length of 2.6775 mm in the z-axis direction. No offset was provided for every junction between middle and intervening sections. In addition, no offset was provided for every junction between input/output and intervening sections. The optical waveguide constituted as described above had an excessive loss of −0.059 dB (for an input wavelength of 1.31 μm) or −0.095 dB (for an input wavelength of 1.55 μm). The optical waveguide of this comparative example showed an excessive loss larger than that of Example 4.

Comparative Example 7

For comparison, an optical waveguide having a total length of 10.91 mm in a z-axis direction and a vibration width of 0.25 mm in an x-axis direction was constituted in the same manner as in Comparative Example 6 except that an offset of 0.2 μm was provided for every junction between middle and intervening sections; and an offset of 0.1 μm was provided for every junction between input/output and intervening sections. The optical waveguide constituted as described above had an excessive loss of −0.013 dB (for an input wavelength of 1.31 μm) or −0.039 dB (for an input wavelength of 1.55 μm). The optical waveguide of this comparative example showed an excessive loss larger than that of Example 4. The excessive loss reduced owing to an effect of the offset at a wavelength of 1.31 μm, but the excessive loss did not sufficiently reduce at a wavelength of 1.55 μm. Thus, low losses were not able to be realized at both wavelengths simultaneously.

Comparative Example 8

For comparison, an optical waveguide having a total length of 10.91 mm in a z-axis direction and a vibration width of 0.25 mm in an x-axis direction was constituted in the same manner as in Comparative Example 6 except that an offset of 0.4 μm was provided for every junction between middle and intervening sections; and an offset of 0.2 μm was provided for every junction between input/output and intervening sections. The optical waveguide constituted as described above had an excessive loss of −0.013 dB (for an input wavelength of 1.31 μm) or −0.019 dB (for an input wavelength of 1.55 μm). The optical waveguide of this comparative example showed an excessive loss larger than that of Example 4. The excessive loss reduced owing to an effect of the offset at both wavelengths of 1.31 μm and 1.55 μm, but the excessive loss did not sufficiently reduce as compared to that of Example 4.

Comparative Example 9

For comparison, an optical waveguide having a total length of 10.91 mm in a z-axis direction and a vibration width of 0.25 mm in an x-axis direction was constituted in the same manner as in Comparative Example 6 except that an offset of 0.6 μm was provided for every junction between middle and intervening sections; and an offset of 0.3 μm was provided for every junction between input/output and intervening sections. The optical waveguide constituted as described above had an excessive loss of −0.060 dB (for an input wavelength of 1.31 μm) or −0.036 dB (for an input wavelength of 1.55 μm). The optical waveguide of this comparative example showed an excessive loss larger than that of Example 4. The excessive loss slightly reduced owing to an effect of the offset about a wavelength of 1.55 μm, but the excessive loss about a wavelength of 1.31 μm was comparable to that of Compara- −0.092 dB (for an input wavelength of 1.55 μm). The optical waveguide of this comparative example showed an excessive loss larger than that of Example 4. The excessive loss increased owing to an adverse effect of the offset about a wavelength of 1.31 μm as compared to that of Comparative Example 6 where no offset was provided. A reducing effect on the excessive loss was slight about a wavelength of 1.55 μm. Thus, low losses were not able to be realized at both wavelengths simultaneously.

Table 2 summarizes the components, shapes, and results of losses of the optical waveguides used in the above-mentioned Example 4 and Comparative Examples 6 to 10. As can be seen from Table 2, the loss of Example 4 about each of wavelengths of 1.31 μm and 1.55 μm was lower than that of any other comparative example. In addition, an optical waveguide constituted by combining circular arcs was evaluated while an offset was variously changed for reducing a loss at a junction. However, low losses at both wavelengths were not able to be satisfied simultaneously. That is, it is found that a low loss cannot be realized in an entire wavelength range in an optical waveguide to be used at multiple wavelengths or an optical waveguide to be used in a wide wavelength range even in a case of offset connection.

TABLE 2

| Item | Input/output section Waveguide shape | Junction Offset | Intervening section Waveguide shape | x width | z length | Junction Offset | Middle Section Waveguide shape | x width | z length | Total length | Wave-Length | Loss dB |
|---|---|---|---|---|---|---|---|---|---|---|---|---|
| Example 4 | Straight Line | Absent | Equation II | 125 μm | 3,000 μm | Absent | Equation IV | 125 μm | 2,355 μm | 10,910 μm | 1.31 μm | −0.004 |
|  |  |  |  |  |  |  |  |  |  |  | 1.55 μm | −0.002 |
| Comparative Example 6 | Straight Line | Absent | Circular arc | 125 μm | 2,677.5 μm | Absent | Circular arc | 125 μm | 2,677.5 μm | 10,910 μm | 1.31 μm | −0.059 |
|  |  |  |  |  |  |  |  |  |  |  | 1.55 μm | −0.095 |
| Comparative Example 7 | Straight Line | 0.1 μm | Circular arc | 125 μm | 2,677.5 μm | 0.2 μm | Circular arc | 125 μm | 2,677.5 μm | 10,910 μm | 1.31 μm | −0.013 |
|  |  |  |  |  |  |  |  |  |  |  | 1.55 μm | −0.039 |
| Comparative Example 8 | Straight Line | 0.2 μm | Circular arc | 125 μm | 2,677.5 μm | 0.4 μm | Circular arc | 125 μm | 2,677.5 μm | 10,910 μm | 1.31 μm | −0.013 |
|  |  |  |  |  |  |  |  |  |  |  | 1.55 μm | −0.019 |
| Comparative Example 9 | Straight Line | 0.3 μm | Circular arc | 125 μm | 2,677.5 μm | 0.6 μm | Circular arc | 125 μm | 2,677.5 μm | 10,910 μm | 1.31 μm | −0.060 |
|  |  |  |  |  |  |  |  |  |  |  | 1.55 μm | −0.036 |
| Comparative Example 10 | Straight Line | 0.4 μm | Circular arc | 125 μm | 2,677.5 μm | 0.8 μm | Circular arc | 125 μm | 2,677.5 μm | 10,910 μm | 1.31 μm | −0.155 |
|  |  |  |  |  |  |  |  |  |  |  | 1.55 μm | −0.092 | tive Example 6 where no offset was provided. Thus, low losses were not able to be realized at both wavelengths simultaneously.

Comparative Example 10

For comparison, an optical waveguide having a total length of 10.91 mm in a z-axis direction and a vibration width of 0.25 mm in an x-axis direction was constituted in the same manner as in Comparative Example 6 except that: an offset of 0.8 μm was provided for a junction of each middle section with each end; and an offset of 0.4 μm was provided for every junction between input/output and intervening sections. The optical waveguide constituted as described above had an excessive loss of −0.155 dB (for an input wavelength of 1.31 μm) or Example 5

Next, the excessive loss of a 1×8 splitter having a constitution shown in FIG. 24 was calculated. In the figure, the optical waveguides of the present invention each having a curve represented by the function of the equation [VII] were used in parts 21 to 26 represented by solid lines, and conventional arc curved optical waveguides or straight line-optical waveguides were used in sections expressed by dotted lines. When the optical waveguide of the present invention was used for connection, an average excessive loss was −9.53 dB (for an input wavelength of 1.31 μm) or −9.66 dB (for an input wavelength of 1.55 μm). Next, for comparison, an excessive loss was calculated by using conventional arc curves in the sections 21 to 26 expressed by solid lines of FIG. 24. When an arc curved optical waveguide was used, an average excessive loss was −9.66 dB (for an input wavelength of 1.31 μm) or −9.72 dB (for an input wavelength of 1.55 μm). A beam propagation method (BPM) was employed for calculating an excessive loss. As described above, using the curved optical waveguide of the second aspect of the invention for connection between branching sections of the optical waveguides was able to reduce a loss.

In addition, a mask having the above core pattern was prepared as described below. Since the dimensions of a core pattern changed depending on a process, a core pattern taking the amounts of changes in dimensions into consideration was drawn by using CAD. The mask was added with an alignment mark for improving the accuracy of position between the mask and a substrate and any other marker to be used in pattern measurement or the like in addition to the core pattern. A procedure for drawing by using CAD is as follows. For improving the efficiency of drawing work, a pattern for one pixel is initially drawn, and the pattern for one pixel is arranged and copied so that the pattern is disposed on the entirety of the mask. The pattern for one pixel can be drawn by using a layer different from a layer which is provided with a layer and on which a core pattern is drawn. A pattern was directly plotted from the CAD drawing drawn as described above on a mask substrate by using an exposing device, whereby a mask in which a pattern part was filled with a Cr metal film and a mask in which a part except a pattern part was filled with a Cr metal film were produced. The above two masks can be separately used depending on the kind of a resist to be used in a core pattern forming process and the kind of a core forming process in the production of an optical waveguide.

As described above, the 1×8 splitter constituted by using the curved optical waveguide of the second aspect of the invention showed an excessive loss lower than that of the conventional splitter constituted by using an S-shape curved optical waveguide having an arc coupling shape.

Example 6

An optical splitter having a curved optical waveguide having a schematic structure shown in FIG. 24 was produced by using the following materials.

Core: OPI-N3205 manufactured by Hitachi Chemical Co., Ltd.

Clad: OPI-N1005 manufactured by Hitachi Chemical Co., Ltd.

Production method; An organic zirconium chelate was applied by means of a spin coating method to a silicon wafer in which V grooves had been formed in such a manner that the chelate would have a thickness of 100 angstroms after drying. After the resultant had been dried, a polyimide resin free of fluorine was applied to the resultant in such a manner that the resin would have a thickness of 0.3 μm after drying. After the resultant had been dried, a lower clad layer (8 μm) and a core layer (6.5 μm) each composed of a polyimide resin containing fluorine were formed. Next, a silicon-containing resist was applied on the core layer to have a thickness of 0.5 μm, and was dried. The resultant was subjected to exposure and development through the core pattern of the mask prepared in Example 2. Then, reactive ion etching was performed through the resist pattern, whereby a core layer was formed. After the resist had been peeled, an upper clad layer (15 μm) was formed, whereby a polyimide optical waveguide was produced. After that, the resultant was cut into a chip by means of dicing.

The resultant optical waveguide was evaluated about insertion loss. Upon evaluation, measurement was performed while an optical fiber was fixed by using the V grooves formed in both ends of the optical waveguide substrate as guides. Semiconductor laser having a wavelength of 1.31 μm was used as a light source. An insertion loss when the curved optical waveguide of the present invention was used was −12.4 dB in a port having the largest loss. An insertion loss when an arc curved optical waveguide was used was −12.5 dB in a port having the largest loss. In addition, a difference between the largest insertion loss and the smallest insertion loss (uniformity) among 8 ports was 1.3 dB in the present invention or 2.4 dB when the arc curved optical waveguide was used.

As described above, the splitter having a 1×8 type tree constitution constituted by using the curved optical waveguide of the second aspect of the invention showed an insertion loss lower than that of the conventional splitter constituted by using the arc curved optical waveguide. In addition, the uniformity of losses among ports of the present invention was much better than that in the case where the arc curved optical waveguide was used.

INDUSTRIAL APPLICABILITY

As described above, in accordance with the invention according to the above item (1), the use of a curved optical waveguide enables to constitute an optical waveguide coupled with straight line-optical waveguides at its both ends without axial deviation and with a low loss.

In accordance with the invention according to the above item (2), an optical waveguide coupled with a straight line-waveguide at one end of the optical waveguide without axial deviation and with a low loss and coupled with a curved optical waveguide having the same curvature as that of the optical waveguide at the other end of the optical waveguide without axial deviation can be constituted. In addition, the use of the curved optical waveguide of the present invention enables to constitute an optical waveguide coupled with a straight line-optical waveguide at one end of the optical waveguide without axial deviation and with a low loss and coupled with an optical waveguide at the other end of the optical waveguide in a state where the axial deviation of the mode center of light from the geometrical center of a waveguide core occurs.

In addition, the curved optical waveguide of the present invention can be joined with a straight line-optical waveguide. In addition, the length of the curved optical waveguide can be shortened because a non-S-shape curved optical waveguide including a core and a clad in which the core shape of the non-S-shape curved optical waveguide has no reversal of a curvature on a halfway, a curvature at one end of the non-S-shape curved optical waveguide gradually approaches zero, and a radius of curvature at the other end of the non-S-shape curved optical waveguide is finite (such as the sections 54 and 2, or the sections 62 and 8 of FIG. 22) is used like the invention according to the above item (8), a multi-mode optical waveguide and a branching section of the optical waveguide (the sections 1 and 2 of FIG. 22) are used like the invention according to the above item (13), or a non-S-shape curved optical waveguide is used according to the invention according to the above item (15) or (16). In addition, a branching ratio is stabilized upon branching, and a branching direction can be converted. As a result, a large scale integration of a splitter can be efficiently realized in a small space (the sections 1 and 3 to 10 of FIG. 22). In addition, the curved optical waveguide of the present invention can be suitably used for joining with a coupling end of a branching section (a 1-ch side in the case of a 1×2 branching section) like the invention according to the above item (14) (the section 1 of FIG. 22). At the joining part, an optical waveguide having a smaller variation upon production and higher yield than those in the case where a conventional curved optical waveguide requiring axial deviation is used can be obtained.

Furthermore, a good optical waveguide can be provided in a wide wavelength range.

In accordance with the invention according to any one of the above items (3) to (17), the curved optical waveguide can be described by using a simple function. Accordingly, a mask for producing the optical waveguide or a forming die for producing the optical waveguide can be easily prepared by using general CAD. Since the curved optical waveguide of the present invention can be described by using a simple function, the optical waveguide can be easily designed by using general simulation software. Some routines of simulation software may have difficulty with an operation for the rotation of an optical waveguide partial structure. In such cases, the use of the curved optical waveguide of the equation [II] can easily provide an optical waveguide parallel with a z direction at its inlet and having an angle of θ relative to the z direction at its outlet. Furthermore, the use of the curved optical waveguide of the equation [III] can easily provide an optical waveguide having an angle of θ1 relative to a z direction at its inlet and an angle of θ2 relative to the z direction at its outlet. As described above, the curved optical waveguide of the present invention has a facilitating effect on an entire process for an optical waveguide including the design of the optical waveguide, the preparation of a mask for the optical waveguide, and the production of the optical waveguide. In addition, good performance of an optical waveguide completed by using the curved optical waveguide can be realized.

In accordance with the invention according to any one of the above items (6) to (17), in particular, the invention according to the above item (16) or (17), the advantages of curved optical waveguides as components can be capitalized, the disadvantages of the waveguides can be compensated, and an optical waveguide having high space efficiency can be obtained.

In the curved optical waveguide of the second aspect of the invention, an end having a curvature of zero can be suitably joined with a coupling end of a branching section (a 1-ch side in the case of a 1×2 branching section) as well as a straight line-optical waveguide. At the joining part, an optical waveguide having a smaller variation upon production and higher yield than those in the case where a conventional curved optical waveguide requiring axial deviation is used can be obtained. Furthermore, a good optical waveguide can be provided in a wide wavelength range. An end having a finite curvature can be suitably joined with a branching end of a branching section (a 2-ch side in the case of a 1×2 branching section) as well as a curved optical waveguide like the invention according to the above item (23). At the joining part, the quantity of light leaking from the middle section of the root of the branch can be reduced even in the case where a narrow width part of the root of the branch is a finite gap. As a result, a branching excessive loss can be reduced. In addition, according to the invention according to any one of the above items (26) to (28), the length of an optical waveguide can be shortened because a non-S-shape curved optical waveguide is used. In addition, a branching ratio is stabilized upon branching, and a branching direction can be converted. As a result, a large scale integration of a splitter can be efficiently realized in a small space.

In accordance with the invention according to any one of the above items (18) to (28), the curved optical waveguide can be described by using a simple function. Accordingly, a mask for producing the optical waveguide or a forming die for producing the optical waveguide can be easily produced by using a general CAD. Since the curved optical waveguide of the present invention can be described by using a simple function, the optical waveguide can be easily designed by using general simulation software.

In accordance with the invention according to any one of the above items (25) to (28), the advantages of curved optical waveguides as components can be capitalized, the disadvantages of the waveguides can be compensated, and an optical waveguide having high space efficiency can be obtained. According to the invention according to any one of the above items (25) to (28), furthermore, a curved optical waveguide can be described by using a simple function. Accordingly, a mask for producing the optical waveguide or a forming die for producing the optical waveguide can be easily produced by using general CAD.

In accordance with the invention according to the above item (29) or (30), a curved optical waveguide which: can be readily processed in a short time period; and is excellent in heat resistance, transmittance, and refractive index property can be obtained.

In accordance with the invention according to the above item (31), an optical splitter, a directional optical coupler, an optical coupler, an optical coupling and branching device, an optical multiplexing and branching filter, an optical transmitter module, an optical receiver module, an optical transmitter/receiver module, an optical switch, an optical modulator, an optical filter, an optical polarizer, an optical dispersion compensator, an optical add-drop module, and an optical cross-connect or the like excellent in optical property and transmission property and having high space efficiency can be obtained.

As described above, in accordance with the curved optical waveguide and optical device of the present invention, a curved optical waveguide and an optical device each of which can be suitably used when optical waveguides having different properties are connected can be obtained.

Figure 1:
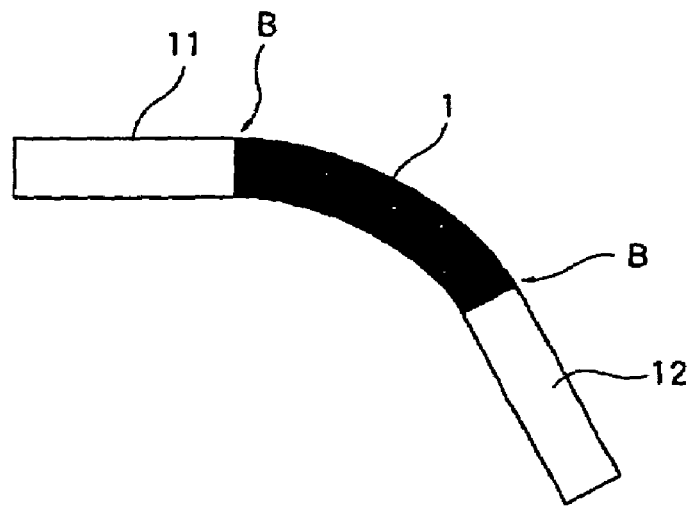
FIG. 1 is a view showing junctions with straight line-optical waveguides at both ends of the curved optical waveguide as a first aspect of the invention.
Figure 2:
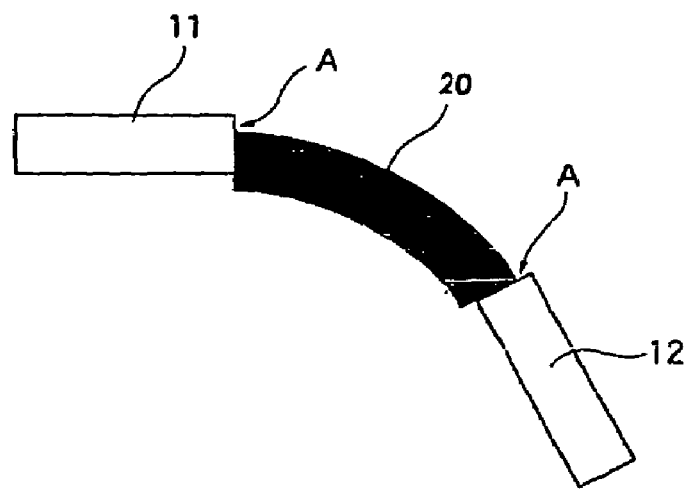
FIG. 2 is a view showing junctions with straight line-optical waveguides at both ends of a conventional curved optical waveguide.
Figure 3:
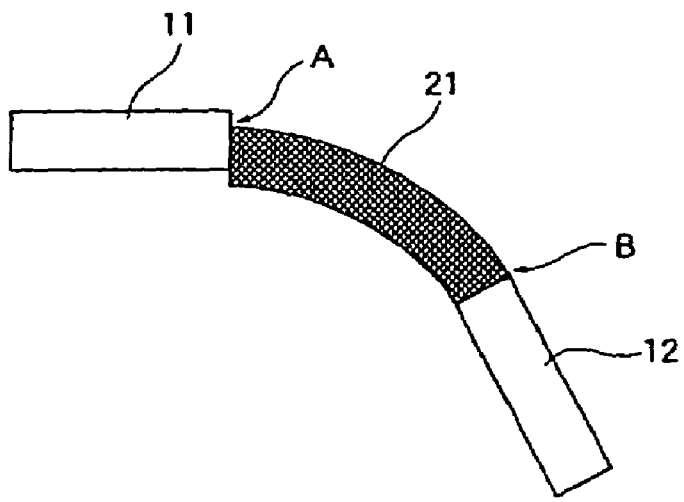
FIG. 3 is a view showing junctions with straight line-optical waveguides at both ends of the curved optical waveguide as a second aspect of the invention.
Figure 4:
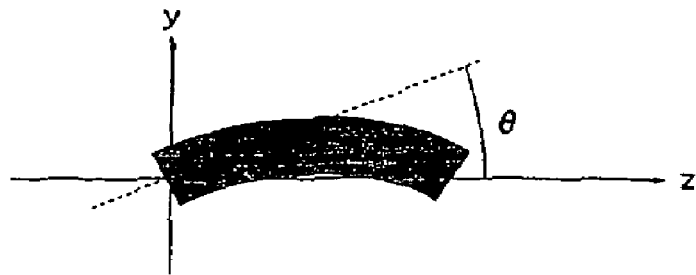
FIG. 4 is an explanatory view in the case where a core shape is defined by the equation [I] in the curved optical waveguide of the first aspect of the invention.
Figure 5:
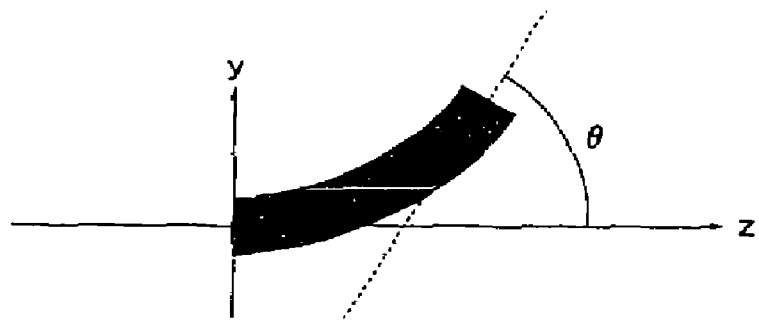
FIG. 5 is an explanatory view in the case where a core shape is defined by the equation [II] or the equation [IV] in a curved optical waveguide of the present invention.
Figure 6:
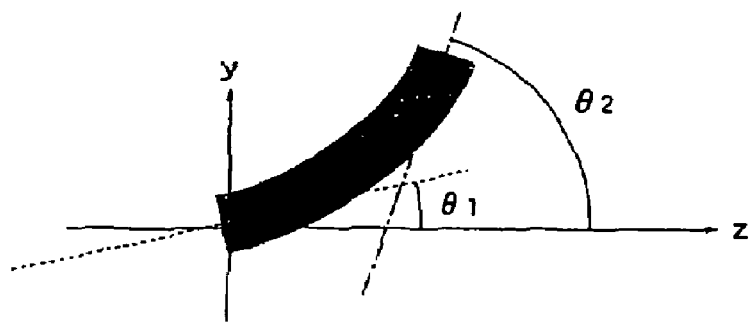
FIG. 6 is an explanatory view in the case where the core shape is defined by the equation [III] or one of the equations [V] to [VII] in the curved optical waveguide of the present invention.
Figure 7:
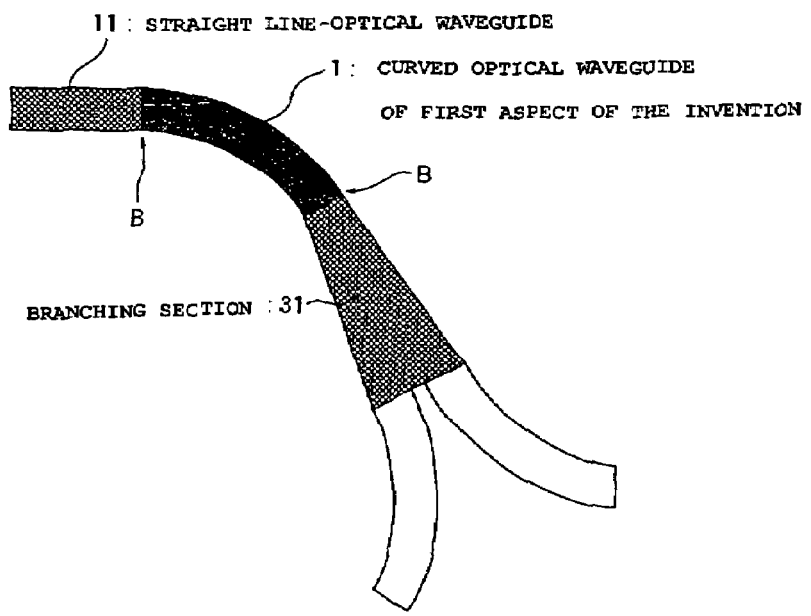
FIG. 7 is a view showing an example of the effective utilization of ends B of the curved optical waveguide shown in FIG. 1.
Figure 8:
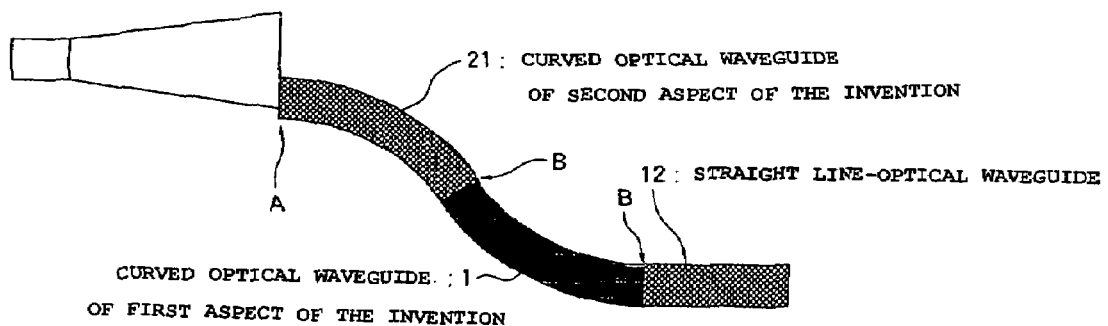
FIG. 8 is a view showing an example of the other effective utilization of the ends B of the curved optical waveguide shown in FIG. 1 different from that shown in FIG. 7.
Figure 9:
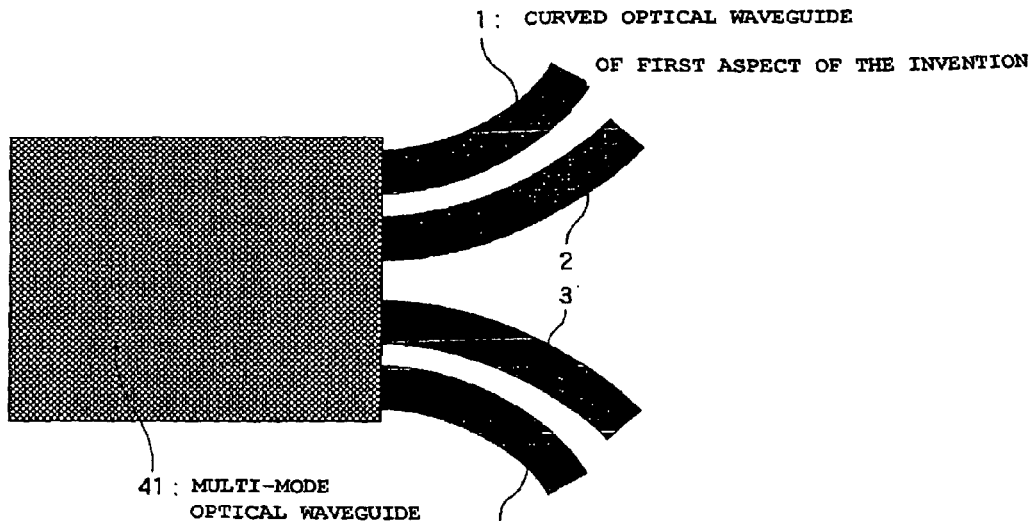
FIG. 9 is a view showing an example of the other effective utilization of the ends B of the curved optical waveguide shown in FIG. 1 further different from that shown in FIG. 8.
Figure 10:
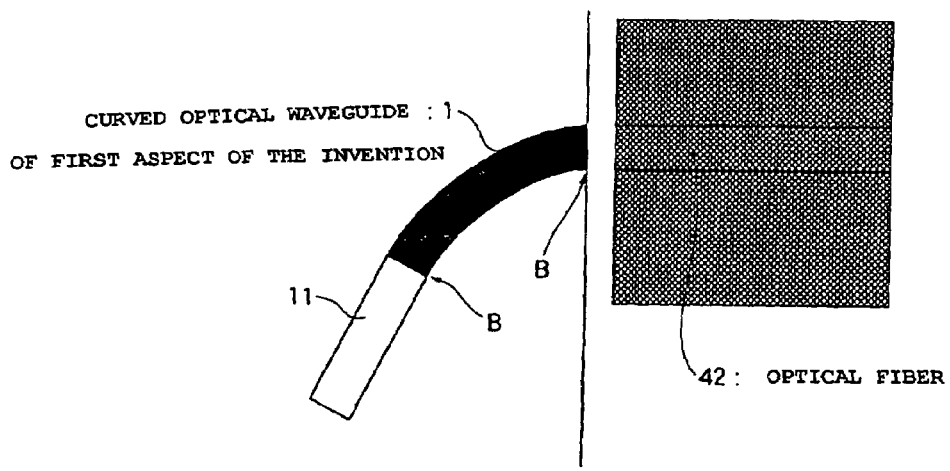
FIG. 10 is a view showing an example of the other effective utilization of the ends B of the curved optical waveguide shown in FIG. 1 further different from that shown in FIG. 9.
Figure 11:
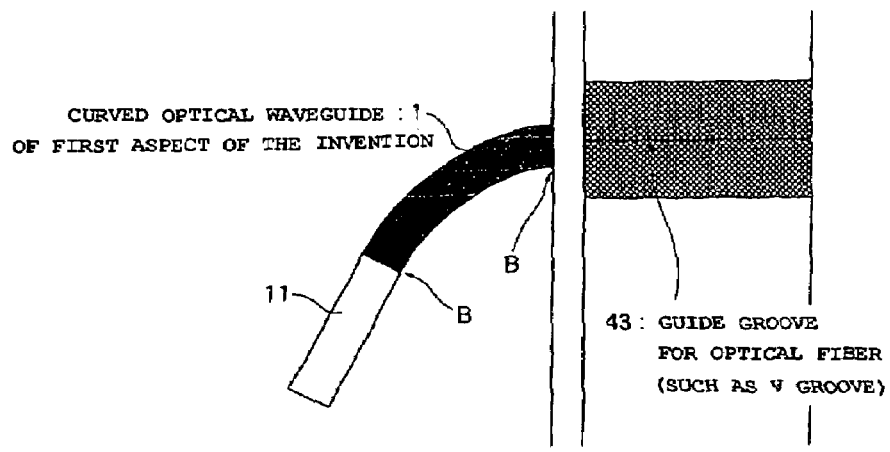
FIG. 11 is a view showing an example of the other effective utilization of the ends of the curved optical waveguide shown in FIG. 1 further different from that shown in FIG. 10.
Figure 12:
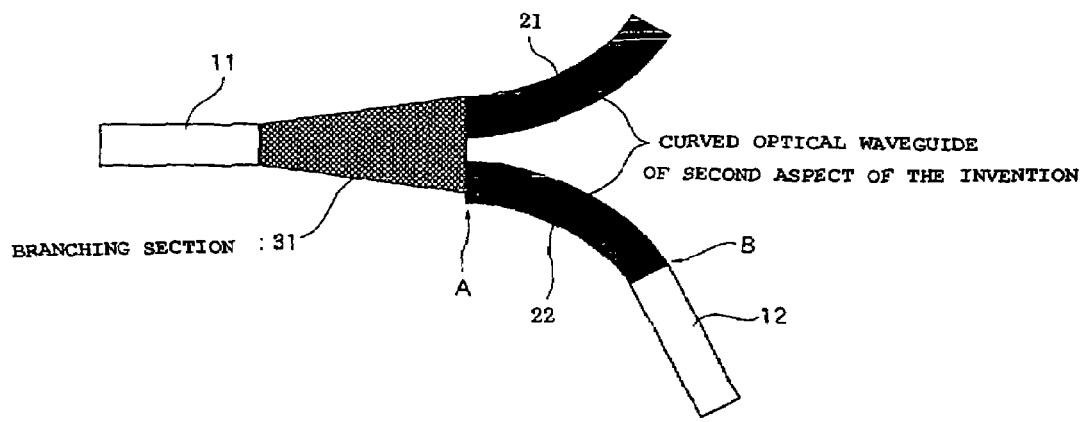
FIG. 12 is a view showing an example of the effective utilization of an end A of the curved optical waveguide shown in FIG. 3.
Figure 13:
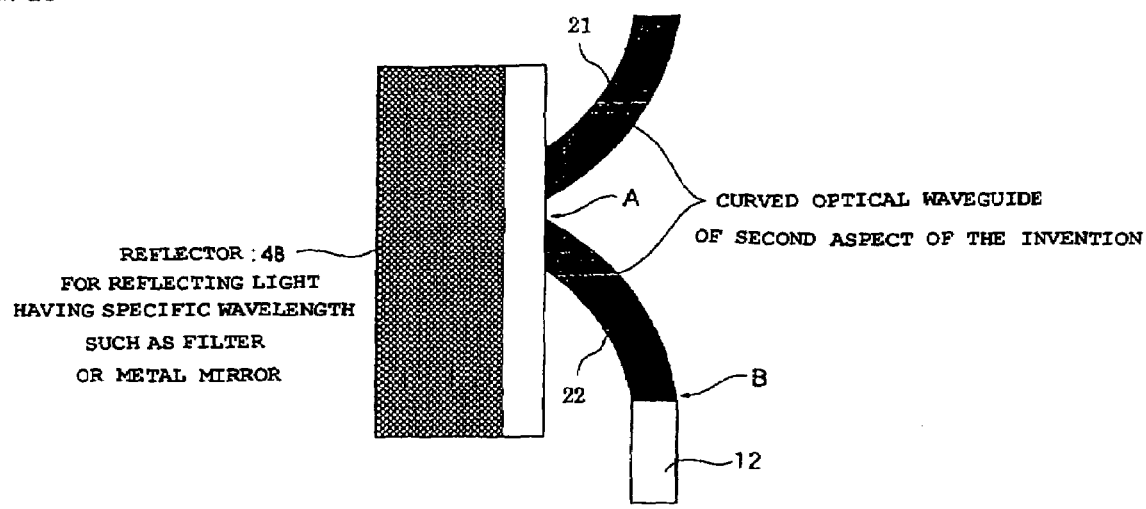
FIG. 13 is a view showing an example of the other effective utilization of the end A of the curved optical waveguide shown in FIG. 3 different from that shown in FIG. 12.
Figure 14:
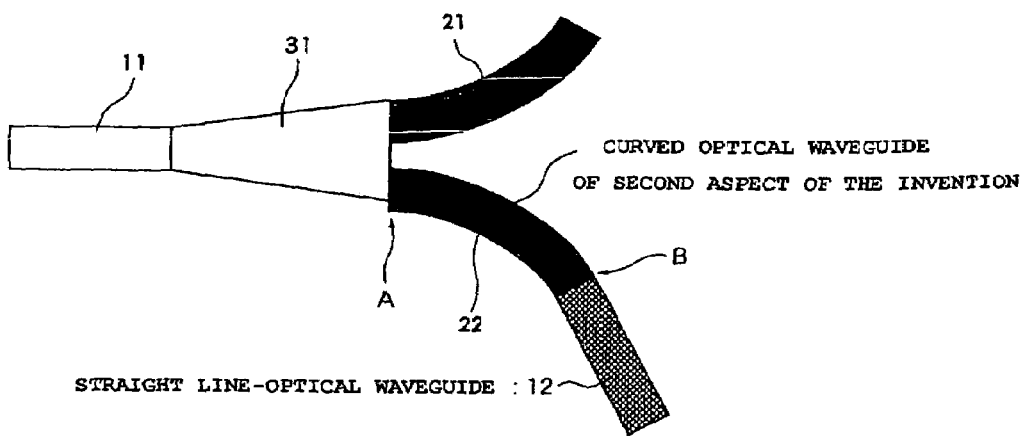
FIG. 14 is a view showing an example of the effective utilization of an end B of the curved optical waveguide shown in FIG. 3.
Figure 15:
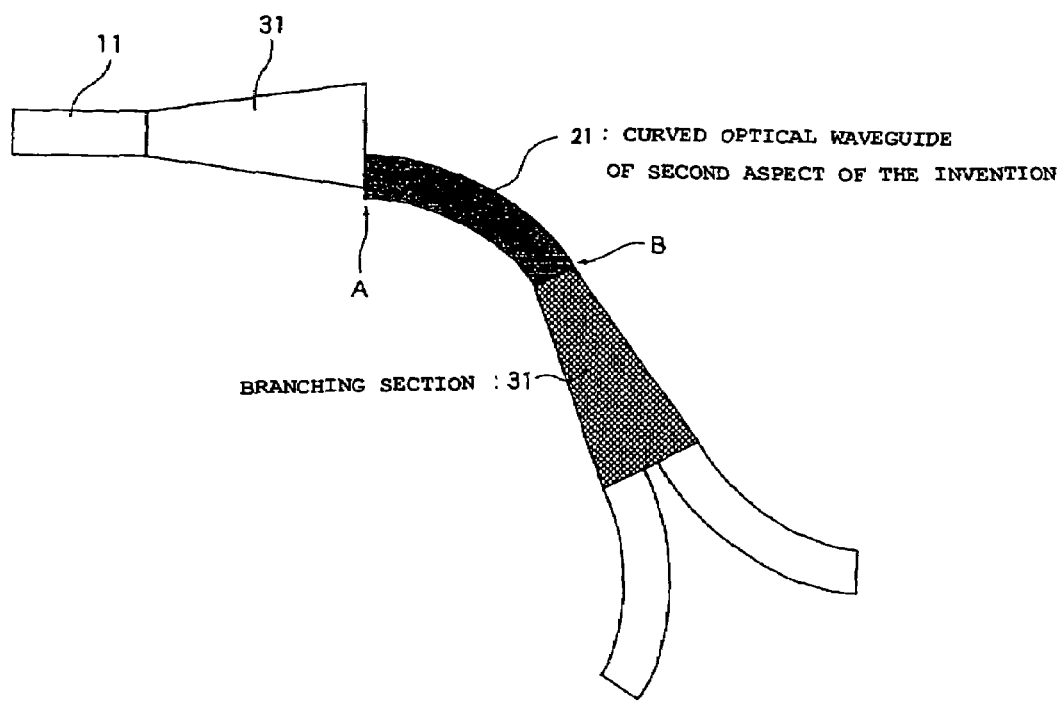
FIG. 15 is a view showing an example of the other effective utilization of the end B of the curved optical waveguide shown in FIG. 3 different from that shown in FIG. 14.
Figure 16:
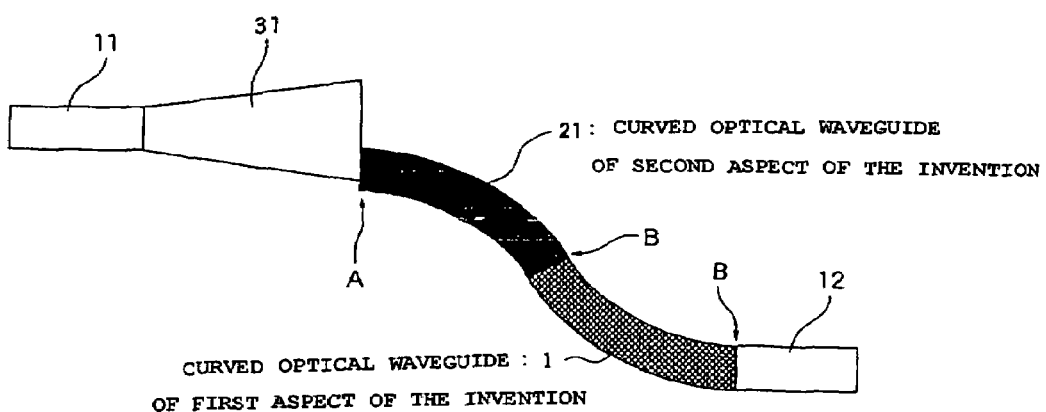
FIG. 16 is a view showing an example of the other effective utilization of the end B of the curved optical waveguide shown in FIG. 3 different from that shown in FIG. 15.
Figure 17:
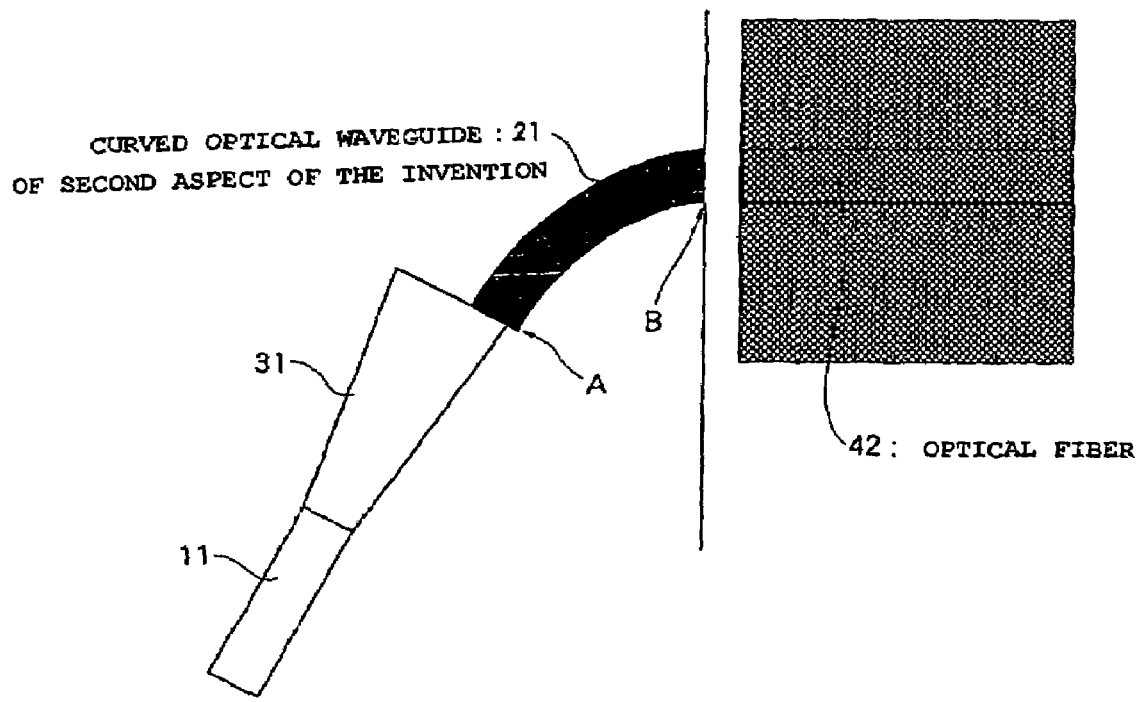
FIG. 17 is a view showing an example of the other effective utilization of the end B of the curved optical waveguide shown in FIG. 3 further different from that shown in FIG. 16.
Figure 18:
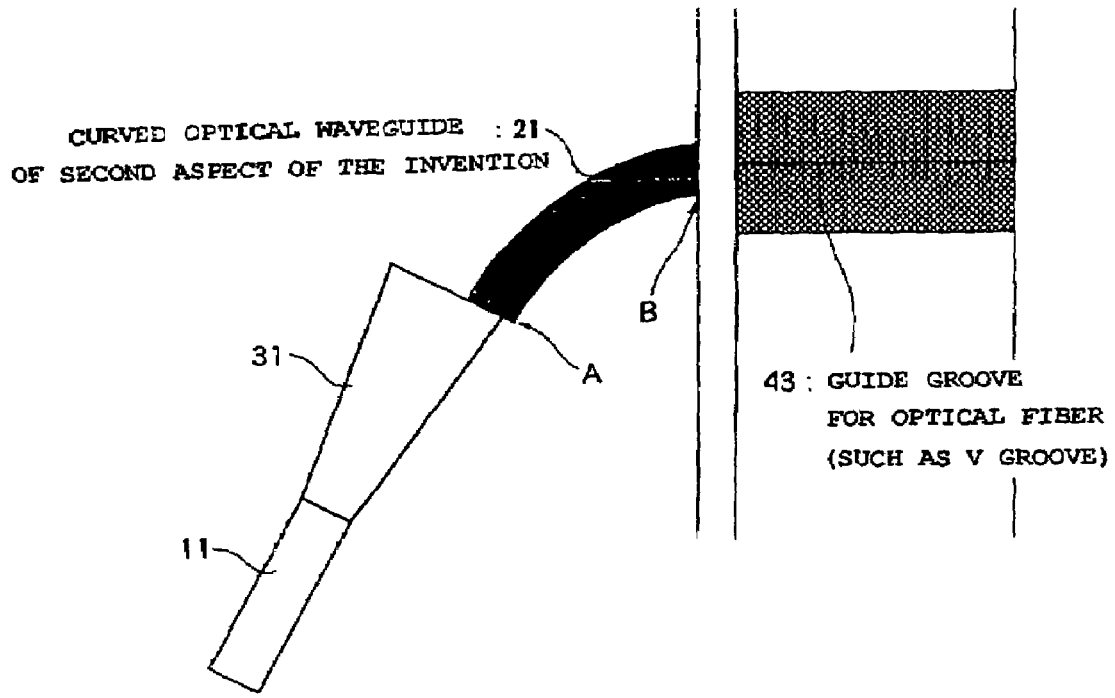
FIG. 18 is a view showing an example of the other effective utilization of the end B of the curved optical waveguide shown in FIG. 3 further different from that shown in FIG. 17.
Figure 19:
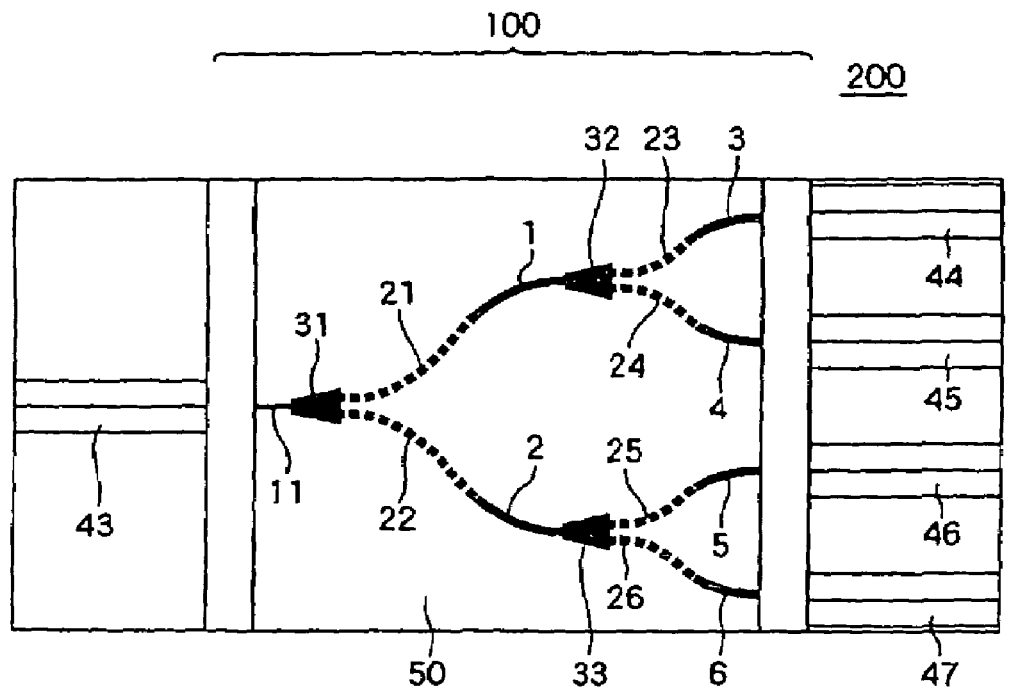
FIG. 19 is a view showing an embodiment of an optical splitter using the curved optical waveguide of the present invention.
Figure 20:
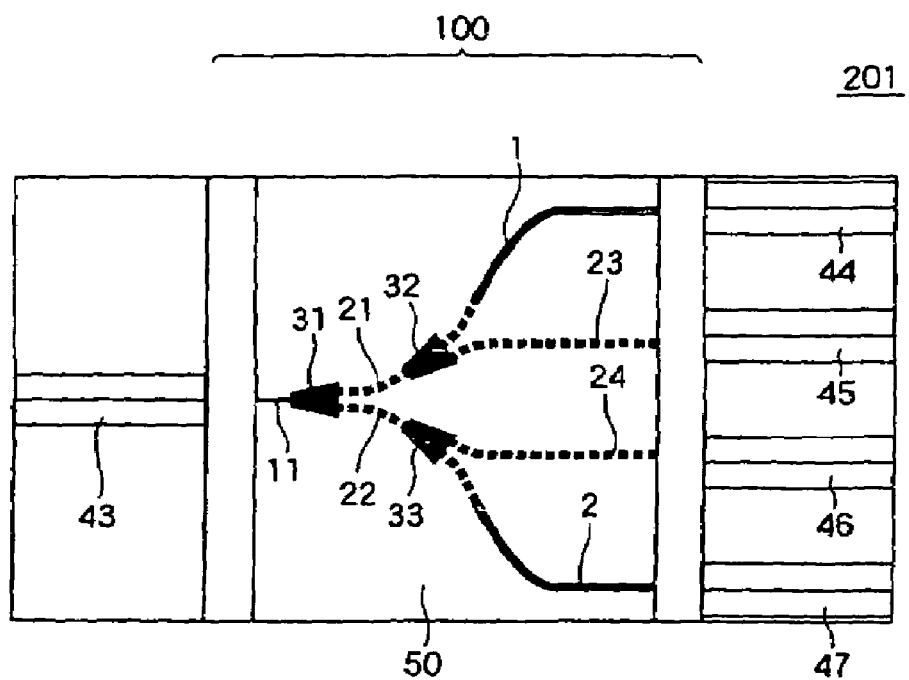
FIG. 20 is a view showing another embodiment of the optical splitter using the curved optical waveguide of the present invention different from that shown in FIG. 19.
Figure 21:
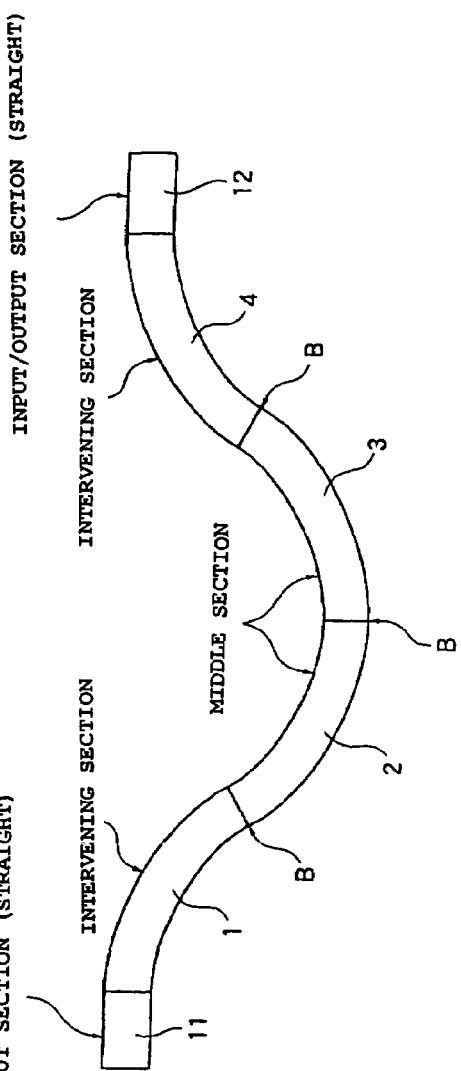
FIG. 21 is a view showing an optical waveguide used in Example 1.
Figure 22:
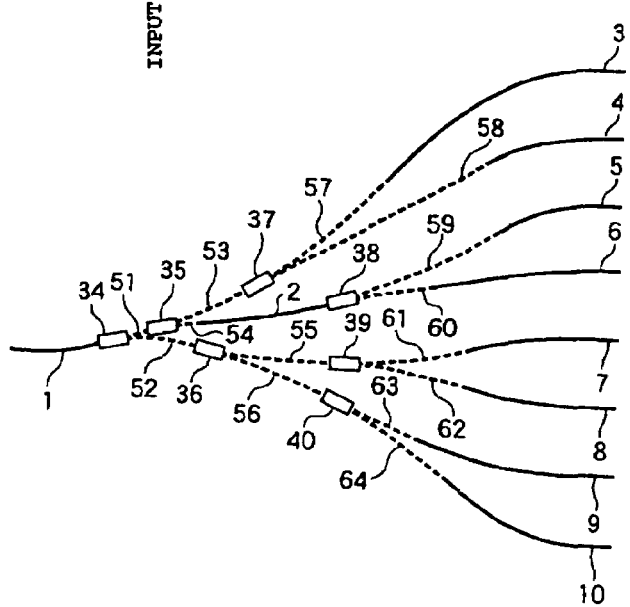
FIG. 22 is a view showing a 1×8 optical splitter used in each of Example 2 and Example 3.
Figure 23:
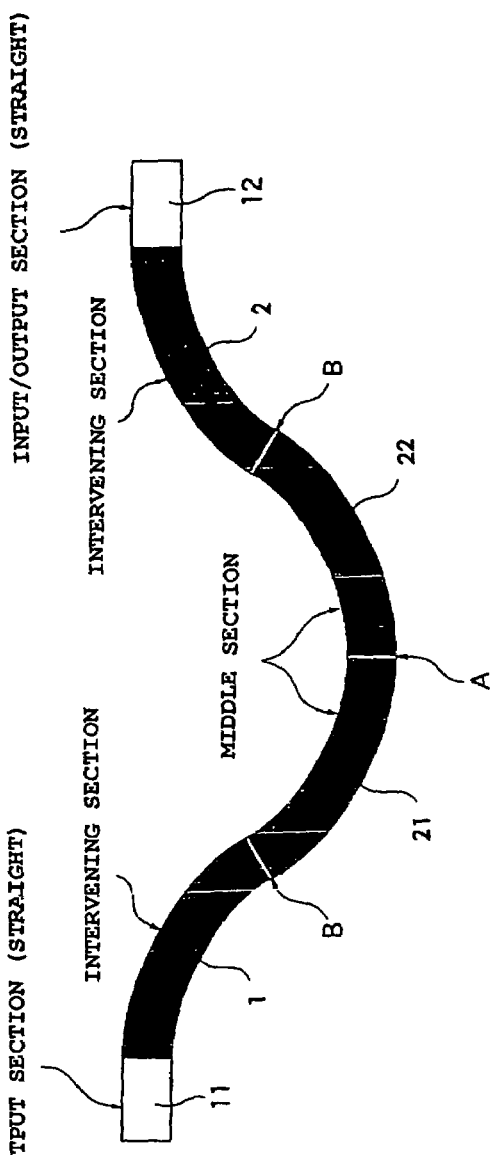
FIG. 23 is a view showing an optical waveguide used in Example 4.
Figure 24:
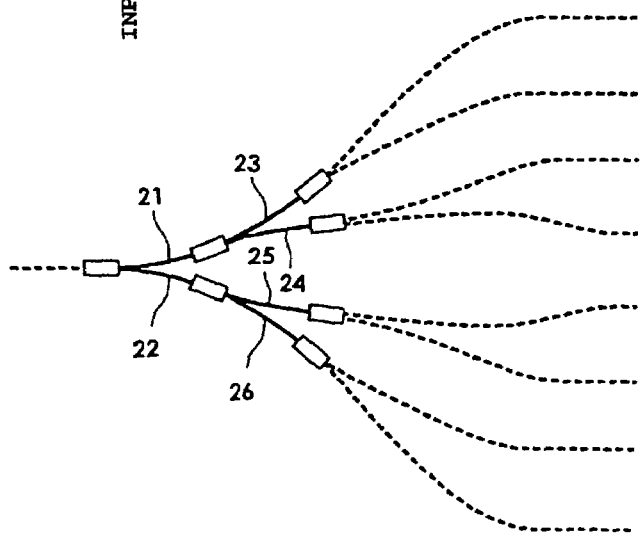
FIG. 24 is a view showing a 1×8 optical splitter used in each of Example 5 and Example 6.

DESCRIPTION OF SYMBOLS 1 to 10: curved optical waveguide of the first aspect of the invention
20: conventional curved optical waveguide
11 to 12: straight line-optical waveguide
21 to 26: straight line-optical waveguide of the second aspect of the invention
31 to 33: branching section
34 to 40: branching section using multi-mode optical waveguide
41: multi-mode optical waveguide
42: optical fiber
43 to 47: guide groove for an optical fiber
48: reflector
50: clad
51 to 64: another new curved optical waveguide to be used in the present invention and/or optical waveguide constituted by a straight line-optical waveguide
100: optical waveguide forming area
200, 201: optical splitter
A: end having a finite radius of curvature
B: end having approximately infinite radius of curvature (a curvature of zero)

The invention claimed is:

1. A curved optical waveguide comprising:
a core; and
a clad,
wherein a core shape of the curved optical waveguide is defined by the following equation [IV]:

$$y=1-\cos[(\pi/2)z] \quad [IV]$$

wherein y and z represent coordinate axes perpendicular to each other on a plane where the optical waveguide is present.

2. An optical waveguide comprising:
the curved optical waveguide according to claim 1; and
an optical waveguide having a different core shape optically connecting with each other.

3. An optical waveguide according to claim 2, wherein the optical waveguide having the different core shape is a branching section of the optical waveguide.

4. An optical waveguide according to claim 3, wherein an outlet of said branching section of the optical waveguide is optically connected with an end of said curved optical waveguide on a Z=0 side.

5. An optical waveguide according to claim 3, wherein an inlet of said branching section of the optical waveguide is optically connected with an end of said curved optical waveguide on a Z=1 side.

6. An optical waveguide comprising:
the curved optical waveguide according to claim 1; and
an optical fiber optically connected with an end of the curved optical waveguide on a z=1 side.

7. An optical waveguide comprising:
the curved optical waveguide according to claim 1; and
a guide groove structure for fixing an optical fiber to an end of the curved optical waveguide on a z=1 side, wherein the guide groove structure is disposed adjacent to each other.

8. An optical waveguide comprising:
the curved optical waveguide according to claim 1; and
a reflecting surface including a filter at an end of the curved optical waveguide on a z=0 side disposed adjacent to each other.

9. A curved optical waveguide comprising:
a core; and
a clad,
wherein a core shape of the curved optical waveguide is defined by the following equation [V]:

$$y=(1-t)f(z)+t\{1-\cos[(\pi/2)z]\} \quad [V]$$

wherein y and z represent coordinate axes perpendicular to each other on a plane where the optical waveguide is present, f(z) represents a continuous function of z which satisfies relationships of f(0)=0, f(1)=1, f''(0)=0, and f''(1)=0 where f''(z) represents a second differential function of f(z) with respect to z, and t represents a real number except zero.

10. An optical waveguide comprising:
the curved optical waveguide according to claim 9; and
an optical waveguide having a different core shape optically connecting with each other.

11. An optical waveguide comprising:
the curved optical waveguide according to claim 9; and
an optical fiber optically connected with an end of the curved optical waveguide on a z=1 side.

12. An optical waveguide comprising:
the curved optical waveguide according to claim 9; and
a guide groove structure for fixing an optical fiber to an end of the curved optical waveguide on a z=1 side, wherein the guide groove structure is disposed adjacent to each other.

13. An optical waveguide comprising:
the curved optical waveguide according to claim 9; and
a reflecting surface including a filter at an end of the curved optical waveguide on a z=0 side disposed adjacent to each other.

14. A curved optical waveguide comprising:
a core; and
a clad,
wherein a core shape of the curved optical waveguide is defined by the following equation [VI]:

$$y=(1-t)z+t\{1-\cos[(\pi/2)z]\} \qquad [VI]$$

wherein y and z represent coordinate axes perpendicular to each other on a plane where the optical waveguide is present, and t represents a real number except zero.

15. An optical waveguide comprising:
the curved optical waveguide according to claim 14; and
an optical waveguide having a different core shape optically connecting with each other.

16. An optical waveguide comprising:
the curved optical waveguide according to claim 14; and
an optical fiber optically connected with an end of the curved optical waveguide on a z=1 side.

17. An optical waveguide comprising:
the curved optical waveguide according to claim 14; and
a guide groove structure for fixing an optical fiber to an end of the curved optical waveguide on a z=1 side, wherein the guide groove structure is disposed adjacent to each other.

18. An optical waveguide comprising:
the curved optical waveguide according to claim 14; and
a reflecting surface including a filter at an end of the curved optical waveguide on a z=0 side disposed adjacent to each other.

19. A curved optical waveguide comprising:
a core; and
a clad,
wherein a core shape of the curved optical waveguide is defined by the following equation [VII]:

$$y=(1-t)[z-(a/\pi)\sin \pi z]+t\{1-\cos[(\pi/2)z]\} \qquad [VII]$$

wherein y and z represent coordinate axes perpendicular to each other on a plane where the optical waveguide is present, and t and a each represent a real number except zero.

20. An optical waveguide comprising:
the curved optical waveguide according to claim 19; and
an optical waveguide having a different core shape optically connecting with each other.

21. An optical waveguide comprising:
the curved optical waveguide according to claim 19; and
an optical fiber optically connected with an end of the curved optical waveguide on a z=1 side.

22. An optical waveguide comprising:
the curved optical waveguide according to claim 19; and
a guide groove structure for fixing an optical fiber to an end of the curved optical waveguide on a z=1 side, wherein the guide groove structure is disposed adjacent to each other.

23. An optical waveguide comprising:
the curved optical waveguide according to claim 19; and
a reflecting surface including a filter at an end of the curved optical waveguide on a z=0 side disposed adjacent to each other.

* * * * *